(12) United States Patent
Watanabe et al.

(10) Patent No.: US 10,942,418 B2
(45) Date of Patent: Mar. 9, 2021

(54) DATA CREATION DEVICE, LIGHT CONTROL DEVICE, DATA CREATION METHOD, AND DATA CREATION PROGRAM

(71) Applicant: HAMAMATSU PHOTONICS K.K., Hamamatsu (JP)

(72) Inventors: Koyo Watanabe, Hamamatsu (JP); Koji Takahashi, Hamamatsu (JP); Takashi Inoue, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 192 days.

(21) Appl. No.: 16/327,891

(22) PCT Filed: Jul. 28, 2017

(86) PCT No.: PCT/JP2017/027501
§ 371 (c)(1),
(2) Date: Feb. 25, 2019

(87) PCT Pub. No.: WO2018/042983
PCT Pub. Date: Mar. 8, 2018

(65) Prior Publication Data
US 2019/0204626 A1     Jul. 4, 2019

(30) Foreign Application Priority Data
Aug. 31, 2016    (JP) .............................. JP2016-169297

(51) Int. Cl.
*G02F 2/00*      (2006.01)
(52) U.S. Cl.
CPC ........ *G02F 2/004* (2013.01); *G02F 2201/305* (2013.01)

(58) Field of Classification Search
CPC ........... G02F 2203/50; G02F 2001/212; G02F 1/0123; G02F 1/225; G02B 26/06
(Continued)

(56) References Cited

U.S. PATENT DOCUMENTS 7,154,660 B2 * 12/2006 Reuter .................. G01M 11/00
                                                    359/291
2008/0246641 A1 * 10/2008 Ohtaka ................. G06F 1/0321
                                                    341/144
(Continued)

FOREIGN PATENT DOCUMENTS

| JP | H11-101944 A | 4/1999 |
|----|----|----|
| JP | 2016-51018 A | 4/2016 |
| WO | WO-2010/060460 A1 | 6/2010 |

OTHER PUBLICATIONS

Hacker, M. et al., "Iterative Fourier transform algorithm for phase-only pulse shaping," Optics Express, vol. 9, No. 4, 2001, pp. 191-199.

(Continued)

*Primary Examiner* — Mohammed A Hasan
(74) *Attorney, Agent, or Firm* — Faegre Drinker Biddle & Reath LLP

(57) ABSTRACT

A Fourier transform is performed on a first waveform function in a frequency domain, and a second waveform function in a time domain including a temporal intensity waveform function and a temporal phase waveform function is generated. A replacement of the temporal intensity waveform function based on a desired waveform is performed for the second waveform function. The second waveform function is modified so as to bring a spectrogram of the second waveform function close to a target spectrogram generated in advance in accordance with a desired wavelength band. An inverse Fourier transform is performed on the modified second waveform function, and a third waveform function in (Continued)

the frequency domain is generated. Data is generated on the basis of an intensity spectrum function or a phase spectrum function of the third waveform function.

7 Claims, 19 Drawing Sheets

(58) Field of Classification Search
USPC .......................................................... 359/279
See application file for complete search history.

(56) References Cited

U.S. PATENT DOCUMENTS

2010/0187208 A1    7/2010  Dantus et al.
2018/0348549 A1*  12/2018  Watanabe ................. G02F 1/13

OTHER PUBLICATIONS

Ripoll, Olivier et al., "Review of iterative Fourier-transform algorithms for beam shaping applications," Optical Engineering, vol. 43, No. 11, 2004, pp. 2549-2556.
Qu, Weidong et al., "Precise design of two-dimensional diffractive optical elements for beam shaping," Applied Optics, vol. 54, No. 21, 2015, pp. 6521-6525.
International Preliminary Report on Patentability dated Mar. 14, 2019 for PCT/JP2017/027501.

* cited by examiner (a)

(b)

(a)

(b)

(a)

(b)

(a)

(b)

(a)

(b)

(a)

(b)

DATA CREATION DEVICE, LIGHT CONTROL DEVICE, DATA CREATION METHOD, AND DATA CREATION PROGRAM

TECHNICAL FIELD

The present disclosure relates to a data creation apparatus, a light control apparatus, a data creation method, and a data creation program.

BACKGROUND ART

Non Patent Document 1 discloses technology for modulating a phase spectrum using a spatial light modulator (SLM) to shape a light pulse. In this document, a phase spectrum for obtaining a desired light pulse waveform is calculated by using an iterative Fourier method.

CITATION LIST

Non Patent Literature

Non Patent Document 1: M. Hacker, G. Stobrawa, T. Feurer, "Iterative Fourier transform algorithm for phase-only pulse shaping", Optics Express, Vol. 9, No. 4, pp. 191-199, 2001

Non Patent Document 2: Olivier Ripoll, Ville Kettunen, Hans Peter Herzig, "Review of iterative Fourier-transform algorithms for beam shaping applications", Optical Engineering, Vol. 43, No. 11, pp. 2549-2556, 2004

SUMMARY OF INVENTION

Technical Problem

For example, as technology for controlling a temporal waveform of a variety of light such as ultrashort pulse light, technology for modulating a phase spectrum and an intensity spectrum of a light pulse by the SLM is known. In this technology, a phase spectrum and an intensity spectrum to bring a temporal intensity waveform of the light close to a desired waveform are calculated, and a modulation pattern to give the phase spectrum and the intensity spectrum to the light is presented on the SLM.

However, in the above conventional technology, only a shape of the temporal intensity waveform can be controlled, and wavelength components (frequency components) of light constituting the temporal intensity waveform cannot be controlled. For example, in the case where output light including a plurality of pulses is generated, if a wavelength can be caused to be different for each of the plurality of pulses, applications to various apparatuses such as a laser processing apparatus, an ultrahigh-speed imaging camera, and a terahertz wave generation apparatus are enabled.

An object of an embodiment is to provide a data creation apparatus, a light control apparatus, a data creation method, and a data creation program capable of controlling wavelength components (frequency components) of light constituting a temporal intensity waveform.

Solution to Problem

An embodiment of the present invention is a data creation apparatus. The data creation apparatus is an apparatus for creating data for controlling a spatial light modulator, and includes a Fourier transform unit for performing a Fourier transform on a first waveform function in a frequency domain including an intensity spectrum function and a phase spectrum function, and generating a second waveform function in a time domain including a temporal intensity waveform function and a temporal phase waveform function; a function replacement unit for performing a replacement of the temporal intensity waveform function based on a desired waveform for the second waveform function; a waveform function modification unit for modifying the second waveform function so as to bring a spectrogram of the second waveform function close to a target spectrogram generated in advance in accordance with the desired waveform and a desired wavelength band; an inverse Fourier transform unit for performing an inverse Fourier transform on the second waveform function after the modification, and generating a third waveform function in the frequency domain; and a data generation unit for generating the data on the basis of an intensity spectrum function or a phase spectrum function of the third waveform function.

An embodiment of the present invention is a data creation method. The data creation method is a method for creating data for controlling a spatial light modulator, and includes a Fourier transform step of performing a Fourier transform on a first waveform function in a frequency domain including an intensity spectrum function and a phase spectrum function, and generating a second waveform function in a time domain including a temporal intensity waveform function and a temporal phase waveform function; a function replacement step of performing a replacement of the temporal intensity waveform function based on a desired waveform for the second waveform function; a waveform function modification step of modifying the second waveform function so as to bring a spectrogram of the second waveform function close to a target spectrogram generated in advance in accordance with the desired waveform and a desired wavelength band; an inverse Fourier transform step of performing an inverse Fourier transform on the second waveform function after the modification, and generating a third waveform function in the frequency domain; and a data generation step of generating the data on the basis of an intensity spectrum function or a phase spectrum function of the third waveform function.

An embodiment of the present invention is a data creation program. The data creation program is a program for creating data for controlling a spatial light modulator, and causes a computer to execute a Fourier transform step of performing a Fourier transform on a first waveform function in a frequency domain including an intensity spectrum function and a phase spectrum function, and generating a second waveform function in a time domain including a temporal intensity waveform function and a temporal phase waveform function; a function replacement step of performing a replacement of the temporal intensity waveform function based on a desired waveform for the second waveform function; a waveform function modification step of modifying the second waveform function so as to bring a spectrogram of the second waveform function close to a target spectrogram generated in advance in accordance with the desired waveform and a desired wavelength band; an inverse Fourier transform step of performing an inverse Fourier transform on the second waveform function after the modification, and generating a third waveform function in the frequency domain; and a data generation step of generating the data on the basis of an intensity spectrum function or a phase spectrum function of the third waveform function.

In the above apparatus, the method, and the program, after generating the second waveform function in the time domain by performing the Fourier transform on the first waveform function in the frequency domain, the replacement of the temporal intensity waveform function based on the desired waveform is performed for the second waveform function. After the replacement of the temporal intensity waveform function, the second waveform function is modified to bring the spectrogram of the second waveform function close to the target spectrogram, before the inverse Fourier transform.

The target spectrogram is generated in advance in accordance with the desired waveform and the desired wavelength band, and the wavelength band of the second waveform function is modified to the desired wavelength band by this process. Therefore, the third waveform function obtained by performing the inverse Fourier transform on the second waveform function also becomes a function in the desired wavelength band. Further, the data for controlling the spatial light modulator is generated on the basis of the intensity spectrum function or the phase spectrum function of the third waveform function. As described above, according to the above apparatus, the method, and the program, wavelength components (frequency components) of light constituting a temporal intensity waveform can be controlled.

Further, another embodiment is a light control apparatus. The light control apparatus includes a light source for outputting input light; a dispersive element for spectrally dispersing the input light; a spatial light modulator for modulating at least one of an intensity spectrum and a phase spectrum of the input light after the dispersion, and outputting modulated light; and an optical system for focusing the modulated light, and the spatial light modulator modulates at least one of the intensity spectrum and the phase spectrum of the input light on the basis of the data created by the data creation apparatus of the above configuration.

According to the above light control apparatus, wavelength components (frequency components) of light constituting a temporal intensity waveform can be controlled by controlling the spatial light modulator on the basis of the data created by the data creation apparatus of the above configuration.

Advantageous Effects of Invention

According to a data creation apparatus, a light control apparatus, a data creation method, and a data creation program according to an embodiment, it is possible to control wavelength components (frequency components) of light constituting a temporal intensity waveform.

DESCRIPTION OF EMBODIMENTS

Hereinafter, embodiments of a data creation apparatus, a light control apparatus, a data creation method, and a data creation program will be described in detail with reference to the accompanying drawings. In the description of the drawings, the same elements will be denoted by the same reference signs, without redundant description.

Figure 1:
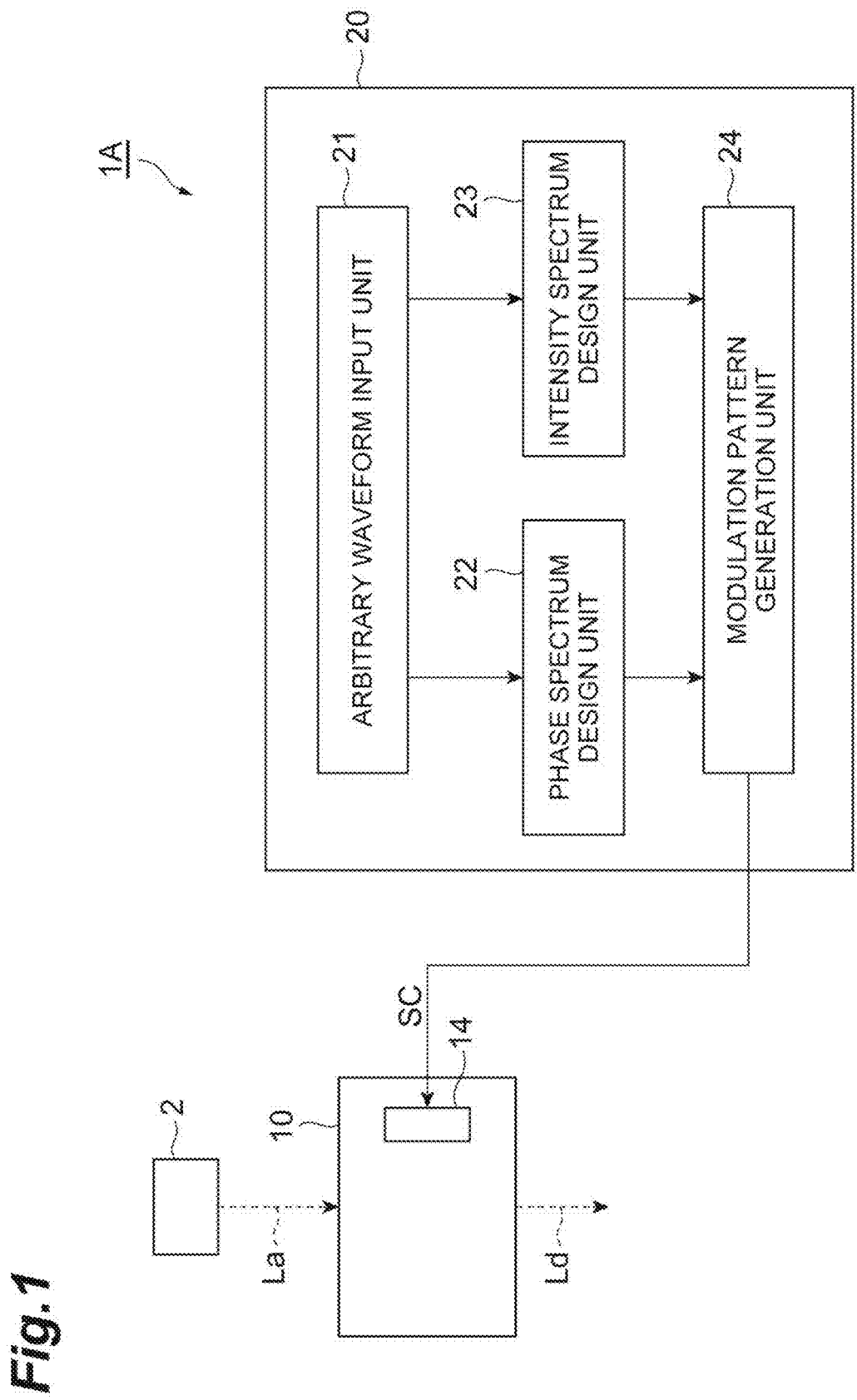
FIG. 1 is a diagram schematically illustrating a configuration of a light control apparatus according to an embodiment.
Figure 2:
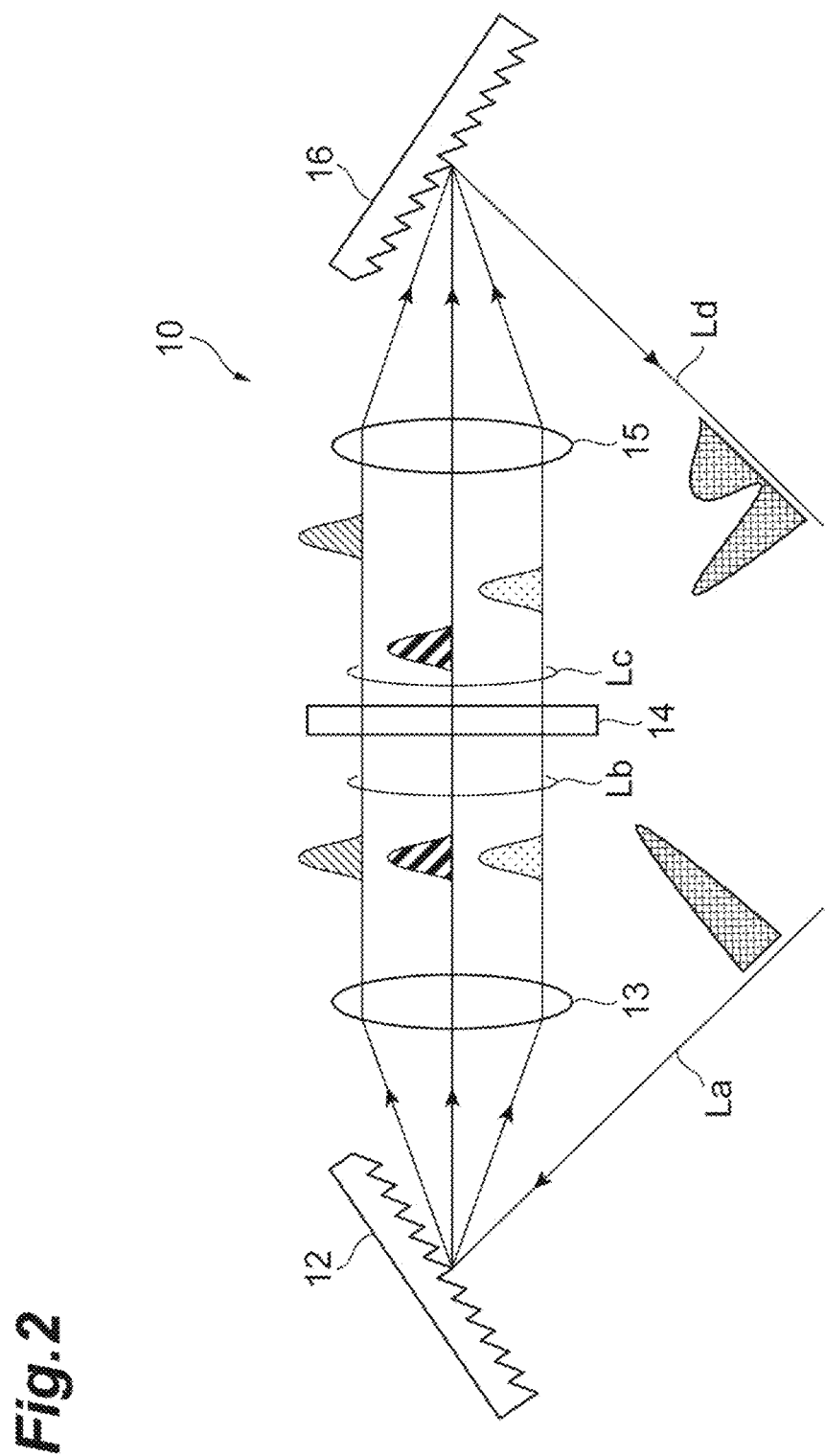
FIG. 2 is a diagram illustrating a configuration of an optical system included in the light control apparatus.

FIG. 1 is a diagram schematically illustrating a configuration of a light control apparatus 1A according to an embodiment. FIG. 2 is a diagram illustrating a configuration of an optical system 10 included in the light control apparatus 1A. The light control apparatus 1A according to the present embodiment generates, from input light La, output light Ld having an arbitrary temporal intensity waveform different from that of the input light La. As illustrated in FIG.

1, the light control apparatus 1A includes a light source 2, an optical system 10, and a modulation pattern calculation apparatus (data creation apparatus) 20.

The light source 2 outputs the input light La input to the optical system 10. The light source 2 is a laser light source such as a solid-state laser light source, for example, and the input light La is coherent pulse light, for example. The optical system 10 has an SLM 14, and receives a control signal SC from the modulation pattern calculation apparatus 20 by the SLM 14. The optical system 10 converts the input light La from the light source 2 into the output light Ld having the arbitrary temporal intensity waveform. A modulation pattern is data for controlling the SLM 14, and is data in which intensities of a complex amplitude distribution or intensities of a phase distribution are output in a file. The modulation pattern is, for example, a computer-generated hologram (CGH).

As illustrated in FIG. 2, the optical system 10 includes a diffraction grating 12, a lens 13, an SLM 14, a lens 15, and a diffraction grating 16. The diffraction grating 12 is a dispersive element in the present embodiment, and is optically coupled to the light source 2. The SLM 14 is optically coupled to the diffraction grating 12 via the lens 13. The diffraction grating 12 spectrally disperses the input light La for each wavelength component. In addition, as the dispersive element, other optical components such as a prism may be used instead of the diffraction grating 12. The input light La is obliquely incident on the diffraction grating 12, and is spectrally dispersed into a plurality of wavelength components. Light Lb including the plurality of wavelength components is focused for each wavelength component by the lens 13, and forms an image on a modulation plane of the SLM 14. The lens 13 may be a convex lens made of a light transmitting member or a concave mirror having a concave light reflection surface.

The SLM 14 simultaneously performs phase modulation and intensity modulation of the light Lb to generate the output light Ld having an arbitrary temporal intensity waveform different from that of the input light La. Further, the SLM 14 may perform only the phase modulation or the intensity modulation. The SLM 14 is of a phase modulation type, for example. In one example, the SLM 14 is of an LCOS (liquid crystal on silicon) type.

Figure 3:
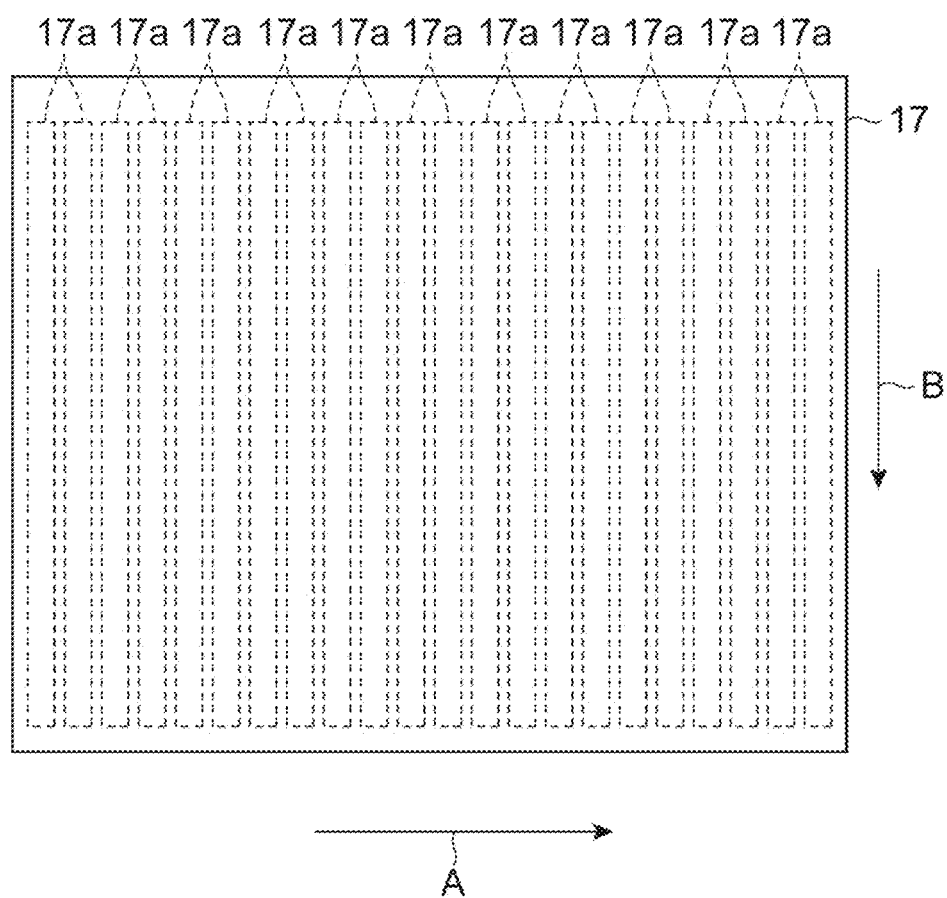
FIG. 3 is a diagram illustrating a modulation plane of an SLM.

FIG. 3 is a diagram illustrating a modulation plane 17 of the SLM 14. As illustrated in FIG. 3, in the modulation plane 17, a plurality of modulation regions 17a are arranged along a certain direction A, and each modulation region 17a extends in a direction B intersecting with the direction A. The direction A is a dispersing direction by the diffraction grating 12. The modulation plane 17 functions as a Fourier transform plane, and each corresponding wavelength component after the dispersion is incident on each of the plurality of modulation regions 17a. The SLM 14 modulates a phase and an intensity of each incident wavelength component, independently from the other wavelength components, in each modulation region 17a. In addition, because the SLM 14 in the present embodiment is of the phase modulation type, the intensity modulation is realized by a phase pattern (phase image) presented on the modulation plane 17.

Each wavelength component of modulated light Lc modulated by the SLM 14 is focused at a point on the diffraction grating 16 by the lens 15. At this time, the lens 15 functions as a focusing optical system for focusing the modulated light Lc. The lens 15 may be a convex lens made of a light transmitting member or a concave mirror having a concave light reflection surface. Further, the diffraction grating 16 functions as a combining optical system, and combines the respective wavelength components after the modulation. That is, by the lens 15 and the diffraction grating 16, the plurality of wavelength components of the modulated light Lc are focused and combined with each other and become the output light Ld.

A region (spectral domain) before the lens 15 and a region (time domain) after the diffraction grating 16 are in a Fourier transform relation with each other, and the phase modulation in the spectral domain affects the temporal intensity waveform in the time domain. Therefore, the output light Ld has a desired temporal intensity waveform different from that of the input light La in accordance with the modulation pattern of the SLM 14.

Figure 4:
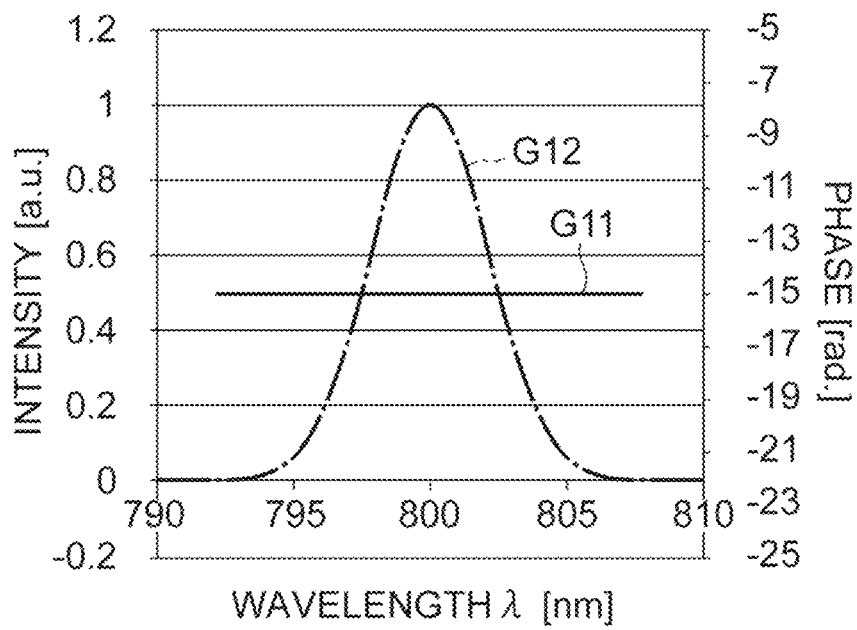
FIG. 4 includes (a) a diagram illustrating a spectrum waveform of single pulse shaped input light, and (b) a diagram illustrating a temporal intensity waveform of the input light.
Figure 4:
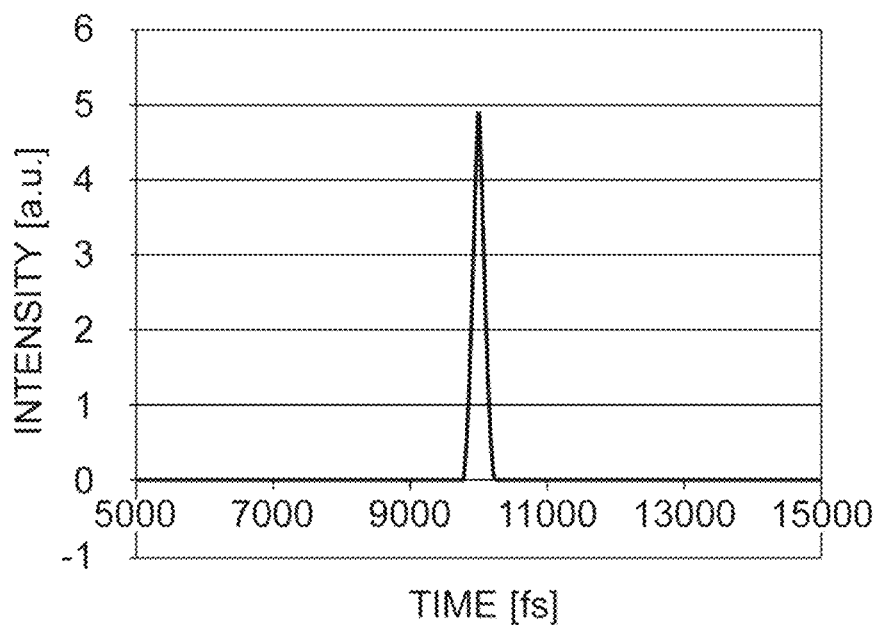
Figure 5:
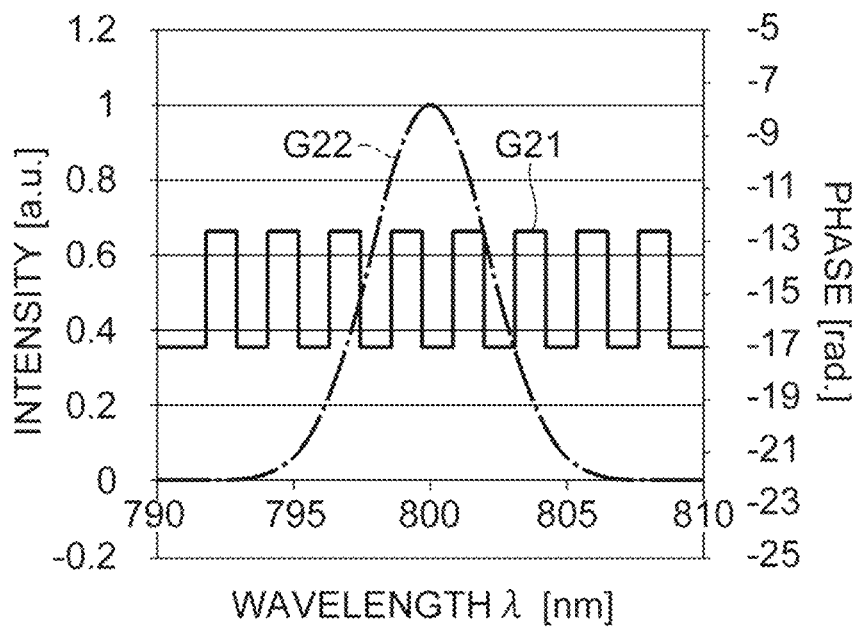
FIG. 5 includes (a) a diagram illustrating a spectrum waveform of output light when rectangular wave shaped phase spectrum modulation is applied in the SLM, and (b) a diagram illustrating a temporal intensity waveform of the output light.
Figure 5:
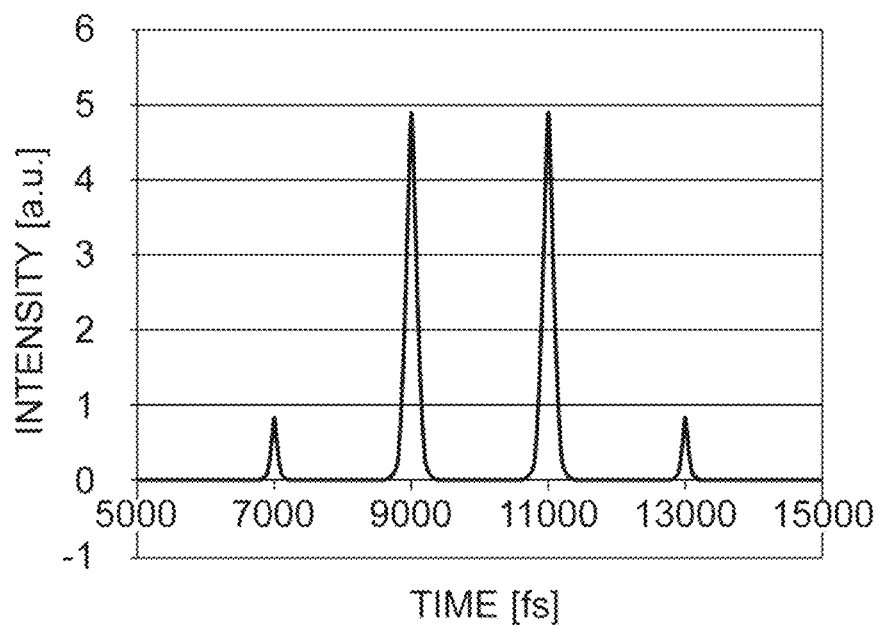

Here, as an example, (a) in FIG. 4 illustrates a spectrum waveform (a spectrum phase G11 and an spectrum intensity G12) of the single pulse shaped input light La, and (b) in FIG. 4 illustrates a temporal intensity waveform of the input light La. Further, as an example, (a) in FIG. 5 illustrates a spectrum waveform (a spectrum phase G21 and an spectrum intensity G22) of the output light Ld when rectangular wave shaped phase spectrum modulation is applied in the SLM 14, and (b) in FIG. 5 illustrates a temporal intensity waveform of the output light Ld. In (a) in FIG. 4 and (a) in FIG. 5, a horizontal axis shows a wavelength (nm), a left vertical axis shows an intensity value (arbitrary unit) of the intensity spectrum, and a right vertical axis shows a phase value (rad) of the phase spectrum. Further, in (b) in FIG. 4 and (b) in FIG. 5, a horizontal axis shows a time (femtosecond) and a vertical axis shows a light intensity (arbitrary unit).

In this example, a single pulse of the input light La is converted into a double pulse with high-order light as the output light Ld by giving a rectangular wave shaped phase spectrum waveform to the output light Ld. In addition, the spectra and the waveform illustrated in FIG. 5 are examples, and the temporal intensity waveform of the output light Ld can be controlled in various shapes by combinations of various phase spectra and intensity spectra.

FIG. 1 is referred to again. The modulation pattern calculation apparatus 20 is a computer having a processor including, for example, a personal computer, a smart device such as a smart phone and a tablet terminal, and a cloud server. The modulation pattern calculation apparatus 20 is electrically coupled to the SLM 14, calculates a phase modulation pattern to bring the temporal intensity waveform of the output light Ld close to a desired waveform, and provides a control signal SC including the phase modulation pattern to the SLM 14.

The modulation pattern calculation apparatus 20 of the present embodiment presents, on the SLM 14, a phase pattern including a phase pattern for phase modulation that gives a phase spectrum for obtaining the desired waveform to the output light Ld and a phase pattern for intensity modulation that gives an intensity spectrum for obtaining the desired waveform to the output light Ld. For this purpose, the modulation pattern calculation apparatus 20 includes an arbitrary waveform input unit 21, a phase spectrum design unit 22, an intensity spectrum design unit 23, and a modulation pattern generation unit (data generation unit) 24. That is, the processor of the computer provided in the modulation pattern calculation apparatus 20 realizes a function of the arbitrary waveform input unit 21, a function of the phase spectrum design unit 22, a function of the intensity spectrum design unit 23, and a function of the modulation pattern generation unit 24. The respective functions may be realized by the same processor or may be realized by different processors.

The processor of the computer can realize the above respective functions by a modulation pattern calculation program (data creation program). Therefore, the modulation pattern calculation program operates the processor of the computer as the arbitrary waveform input unit 21, the phase spectrum design unit 22, the intensity spectrum design unit 23, and the modulation pattern generation unit 24 in the modulation pattern calculation apparatus 20.

The modulation pattern calculation program is stored in a storage device (storage medium) inside or outside the computer. The storage device may be a non-transitory recording medium. Examples of the recording medium include a recording medium such as a flexible disk, a CD, and a DVD, a recording medium such as a ROM, a semiconductor memory, a cloud server, and the like.

The arbitrary waveform input unit 21 receives the desired temporal intensity waveform input from an operator. The operator inputs information (for example, a pulse width) on the desired temporal intensity waveform to the arbitrary waveform input unit 21. The information on the desired temporal intensity waveform is given to the phase spectrum design unit 22 and the intensity spectrum design unit 23. The phase spectrum design unit 22 calculates a corresponding phase spectrum of the output light Ld, on the basis of the temporal intensity waveform. The intensity spectrum design unit 23 calculates a corresponding intensity spectrum of the output light Ld, on the basis of the temporal intensity waveform.

The modulation pattern generation unit 24 calculates a phase modulation pattern (for example, a computer-generated hologram) to give the phase spectrum obtained in the phase spectrum design unit 22 and the intensity spectrum obtained in the intensity spectrum design unit 23 to the output light Ld. In addition, the control signal SC including the calculated phase modulation pattern is provided to the SLM 14, and the SLM 14 is controlled on the basis of the control signal SC.

Figure 6:
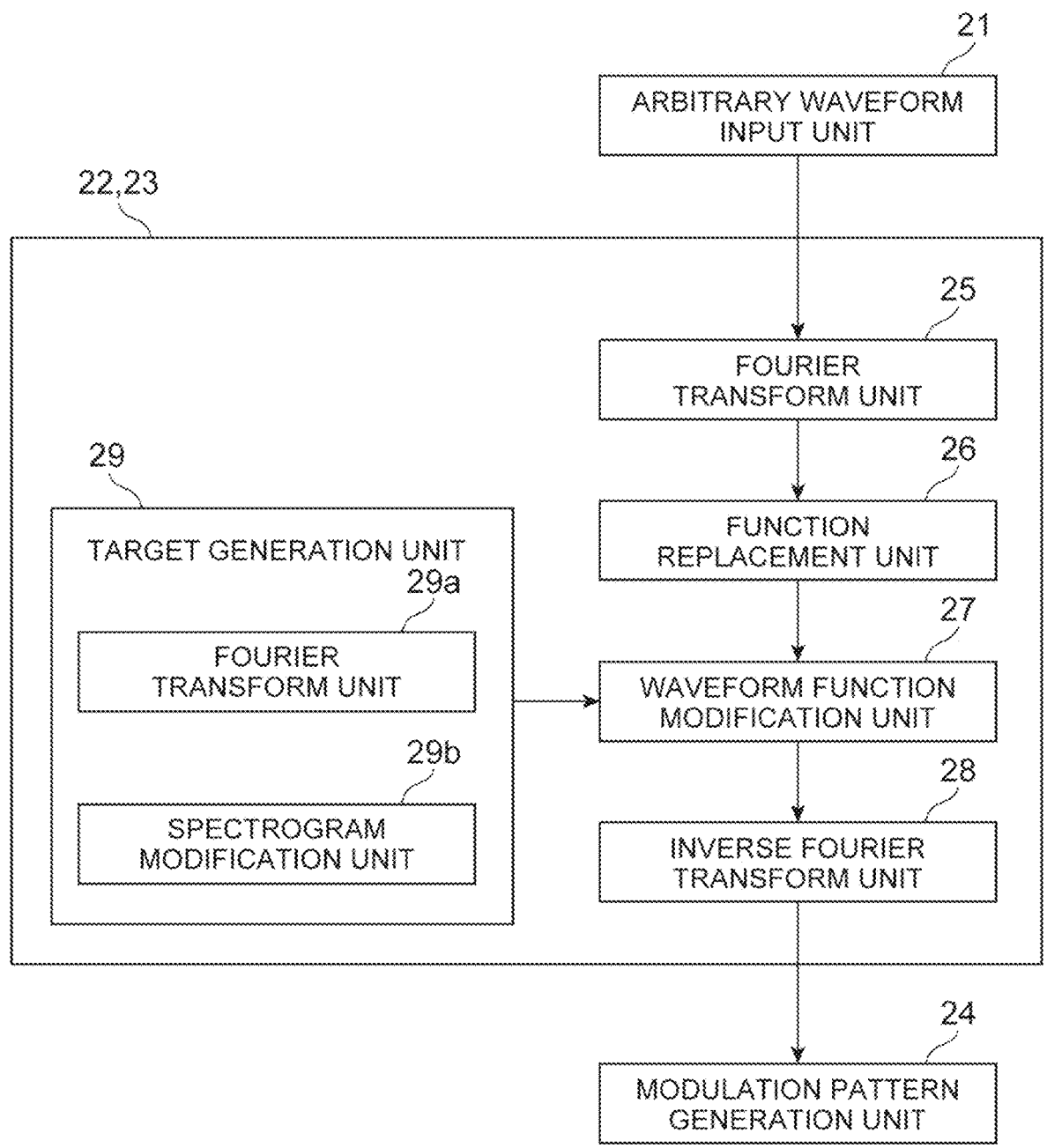
FIG. 6 is a block diagram illustrating an internal configuration of a phase spectrum design unit and an intensity spectrum design unit.

FIG. 6 is a block diagram illustrating an internal configuration of the phase spectrum design unit 22 and the intensity spectrum design unit 23. As illustrated in FIG. 6, each of the phase spectrum design unit 22 and the intensity spectrum design unit 23 includes a Fourier transform unit 25, a function replacement unit 26, a waveform function modification unit 27, an inverse Fourier transform unit 28, and a target generation unit 29. The target generation unit 29 includes a Fourier transform unit 29a and a spectrogram modification unit 29b. A function of each of these components will be described in detail later.

Figure 7:
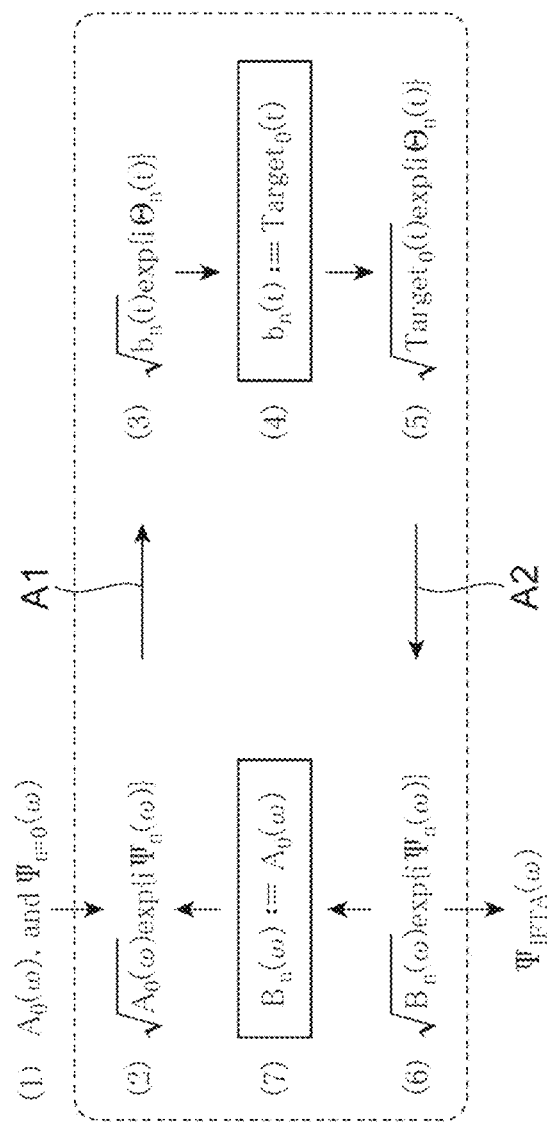
FIG. 7 is a diagram illustrating a calculation procedure of a phase spectrum using an iterative Fourier transform method.

Here, the desired temporal intensity waveform is represented as a function in a time domain, and the phase spectrum is represented as a function in a frequency domain. Therefore, the phase spectrum corresponding to the desired temporal intensity waveform is obtained by, for example, an iterative Fourier transform based on the desired temporal intensity waveform. FIG. 7 is a diagram illustrating a calculation procedure of the phase spectrum using the iterative Fourier transform method.

First, an initial intensity spectrum function $A_0(\omega)$ and a phase spectrum function $\Psi_0(\omega)$ to be functions of a frequency $\omega$ are prepared (process number (1) in the drawing). In one example, the intensity spectrum function $A_0(\omega)$ and the phase spectrum function $\Psi_0(\omega)$ represent the spectrum intensity and the spectrum phase of the input light La, respectively. Next, a waveform function (a) in the frequency domain including the intensity spectrum function $A_0(\omega)$ and the phase spectrum function $\Psi_n(\omega)$ is prepared (process number (2) in the drawing).

[Formula 1]

$$\sqrt{A_0(\omega)}\exp\{i\Psi_n(\omega)\} \quad (a)$$

A subscript n represents after an n-th Fourier transform process. Before a first Fourier transform process, the initial phase spectrum function $\Psi_0(\omega)$ described above is used as the phase spectrum function $\Psi_n(\omega)$. i is an imaginary number.

Next, a Fourier transform from the frequency domain to the time domain is performed on the function (a) (arrow A1 in the drawing). As a result, a waveform function (b) in the frequency domain including a temporal intensity waveform function $b_n(t)$ and a temporal phase waveform function $\Theta_n(t)$ is obtained (process number (3) in the drawing).

[Formula 2]

$$\sqrt{b_n(t)}\exp\{i\Theta_n(t)\} \quad (b)$$

Next, the temporal intensity waveform function $b_n(t)$ included in the function (b) is replaced by a temporal intensity waveform function $Target_0(t)$ based on the desired waveform (process numbers (4) and (5) in the drawing).

[Formula 3]

$$b_n(t):=Target_0(t) \quad (c)$$

[Formula 4]

$$\sqrt{Target_0(t)}\exp\{i\Theta_n(t)\} \quad (d)$$

Next, an inverse Fourier transform from the time domain to the frequency domain is performed on the function (d) (arrow A2 in the drawing). As a result, a waveform function (e) in the frequency domain including an intensity spectrum function $B_n(\omega)$ and the phase spectrum function $\Psi_n(\omega)$ is obtained (process number (6) in the drawing).

[Formula 5]

$$\sqrt{B_n(\omega)}\exp\{i\Psi_n(\omega)\} \quad (e)$$

Next, to constrain the intensity spectrum function $B_n(\omega)$ included in the function (e), this is replaced by the initial intensity spectrum function $A_0(\omega)$ (process number (7) in the drawing).

[Formula 6]

$$B_n(\omega):=A_0(\omega) \quad (f)$$

Subsequently, the above processes (1) to (7) are repeatedly performed a plurality of times, so that the phase spectrum shape represented by the phase spectrum function $\Psi_n(\omega)$ in the waveform function can be brought close to a phase spectrum shape corresponding to the desired temporal intensity waveform. A phase spectrum function $\Psi_{IFTA}(\omega)$ to be finally obtained becomes a basis of a modulation pattern for obtaining the desired temporal intensity waveform.

However, in the iterative Fourier method described above, although it is possible to control the temporal intensity waveform, there is a problem in that it is not possible to control a frequency component (band wavelength) constituting the temporal intensity waveform. For example, in the case where the output light Ld includes a plurality of light pulses, if a wavelength can be caused to be different for each of the light pulses, applications to various apparatuses such as a laser processing apparatus, an ultrahigh-speed imaging camera, and a terahertz wave generation apparatus are enabled.

Figure 8:
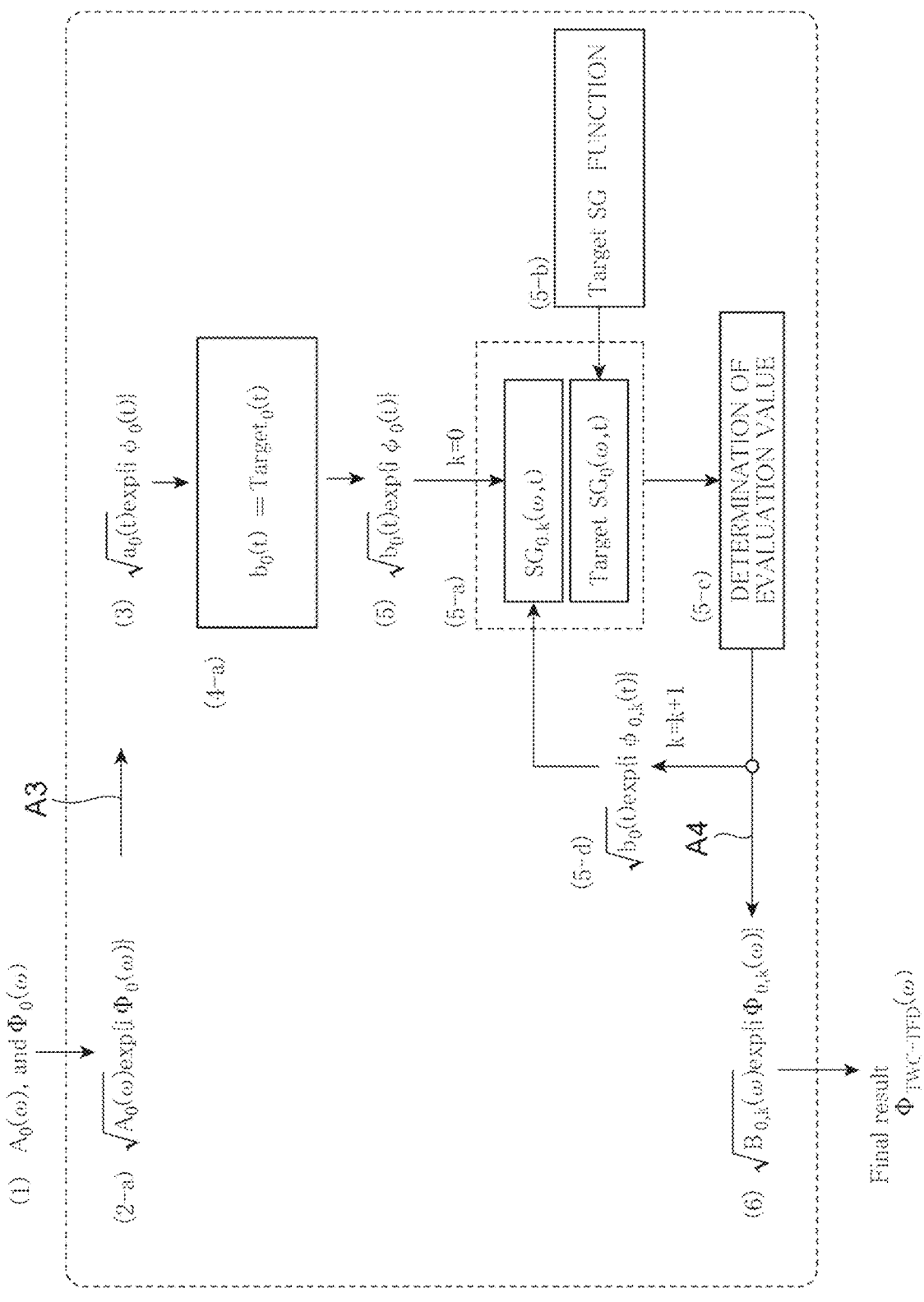
FIG. 8 is a diagram illustrating a calculation procedure of a spectrum phase in the phase spectrum design unit.

Therefore, the modulation pattern calculation apparatus 20 according to the present embodiment calculates the phase spectrum function and the intensity spectrum function on which the modulation pattern is based, using a calculation method described below. FIG. 8 is a diagram illustrating a calculation procedure of the phase spectrum function in the phase spectrum design unit 22.

First, an initial intensity spectrum function $A_0(\omega)$ and a phase spectrum function $\Phi_0(\omega)$ to be functions of a frequency co are prepared (process number (1) in the drawing). In one example, the intensity spectrum function $A_0(\omega)$ and the phase spectrum function $\Phi_0(\omega)$ represent the spectrum intensity and the spectrum phase of the input light La, respectively. Next, a first waveform function (g) in the frequency domain including the intensity spectrum function $A_0(\omega)$ and the phase spectrum function $\Phi_0(\omega)$ is prepared (process number (2-a)). Here, i is an imaginary number.

[Formula 7]

$$\sqrt{A_0(\omega)}\exp\{i\Phi_0(\omega)\} \qquad (g)$$

Next, the Fourier transform unit 25 of the phase spectrum design unit 22 performs the Fourier transform from the frequency domain to the time domain on the function (g) (arrow A3 in the drawing). As a result, a second waveform function (h) in the time domain including a temporal intensity waveform function $a_0(t)$ and a temporal phase waveform function $\phi_0(t)$ is obtained (Fourier transform step and process number (3)).

[Formula 8]

$$\sqrt{a_0(t)}\exp\{i\varphi_0(t)\} \qquad (h)$$

Next, as shown in the following Formula (i), the function replacement unit 26 of the phase spectrum design unit 22 inputs the temporal intensity waveform function $Target_0(t)$ based on the desired waveform input in the arbitrary waveform input unit 21 to a temporal intensity waveform function $b_0(t)$ (process number (4-a)).

[Formula 9]

$$b_0(T)=Target_0(t) \qquad (i)$$

Next, as shown in the following Formula (j), the function replacement unit 26 of the phase spectrum design unit 22 replaces the temporal intensity waveform function $a_0(t)$ by the temporal intensity waveform function $b_0(t)$. That is, the temporal intensity waveform function $a_0(t)$ included in the function (h) is replaced by the temporal intensity waveform function $Target_0(t)$ based on the desired waveform (function replacement step and process number (5)).

[Formula 10]

$$\sqrt{b_0(t)}\exp\{i\varphi_0(t)\} \qquad (j)$$

Next, the waveform function modification unit 27 of the phase spectrum design unit 22 modifies the second waveform function so as to bring a spectrogram of the second waveform function (j) after the replacement close to a target spectrogram generated in advance in accordance with a desired wavelength band. First, the second waveform function (j) is transformed into a spectrogram $SG_{0,k}(\omega,t)$ by performing a time-frequency transform on the second waveform function (j) after the replacement (process number (5-a) in the drawing). A subscript k represents a k-th transform process.

Here, the time-frequency transform is a process of performing a frequency filter process or a numerical operation process (a process of multiplying a window function while shifting the window function and deriving a spectrum for each time) on a composite signal such as a temporal waveform, and transforming it into three-dimensional information including a time, a frequency, and an intensity (spectrum intensity) of a signal component. Further, in the present embodiment, a transform result (the time, the frequency, and the spectrum intensity) is defined as a "spectrogram".

Examples of the time-frequency transform include a short-time Fourier transform (STFT), a wavelet transform (a Haar wavelet transform, a Gabor wavelet transform, a Mexican hat wavelet transform, and a Morlet wavelet transform), and the like.

Further, a target spectrogram $TargetSG_0(\omega,t)$ generated in advance in accordance with the desired wavelength band is read from the target generation unit 29. The target spectrogram $TargetSG_0(\omega,t)$ is roughly equivalent to a target temporal waveform (a temporal intensity waveform and frequency components constituting it), and is generated in a target spectrogram function of a process number (5-b).

Next, the waveform function modification unit 27 of the phase spectrum design unit 22 performs pattern matching between the spectrogram $SG_{0,k}(\omega,t)$ and the target spectrogram $TargetSG_0(\omega,t)$, and checks a similarity degree (matching degree). In the present embodiment, an evaluation value is calculated as an index representing the similarity degree. Then, in the subsequent process number (5-c), it is determined whether or not the obtained evaluation value satisfies a predetermined end condition. When the condition is satisfied, the process proceeds to a process number (6), and when the condition is not satisfied, the process proceeds to a process number (5-d). In the process number (5-d), the temporal phase waveform function $\phi_0(t)$ included in the second waveform function is changed to an arbitrary temporal phase waveform function $\phi_{0,k}(t)$. The second waveform function after changing the temporal phase waveform function is again transformed into a spectrogram by the time-frequency transform such as STFT.

Subsequently, the above process numbers (5-a) to (5-c) are repeatedly performed. In this way, the second waveform function is modified so as to bring the spectrogram $SG_{0,k}(\omega,t)$ gradually close to the target spectrogram $TargetSG_0(\omega,t)$ (waveform function modification step).

Thereafter, the inverse Fourier transform unit 28 of the phase spectrum design unit 22 performs the inverse Fourier transform on the second waveform function after the modification (arrow A4 in the drawing) to generate a third waveform function (k) in the frequency domain (inverse Fourier transform step and process number (6)).

[Formula 11]

$$\sqrt{B_{0,k}(\omega)}\exp\{i\Phi_{0,k}(\omega)\} \qquad (k)$$

A phase spectrum function $\Phi_{0,k}(\omega)$ included in the third waveform function (k) becomes a desired phase spectrum function $\Phi_{TWC-TFD}(\omega)$ to be finally obtained. The phase spectrum function $\Phi_{TWC-TFD}(\omega)$ is provided to the modulation pattern generation unit 24.

Figure 9:
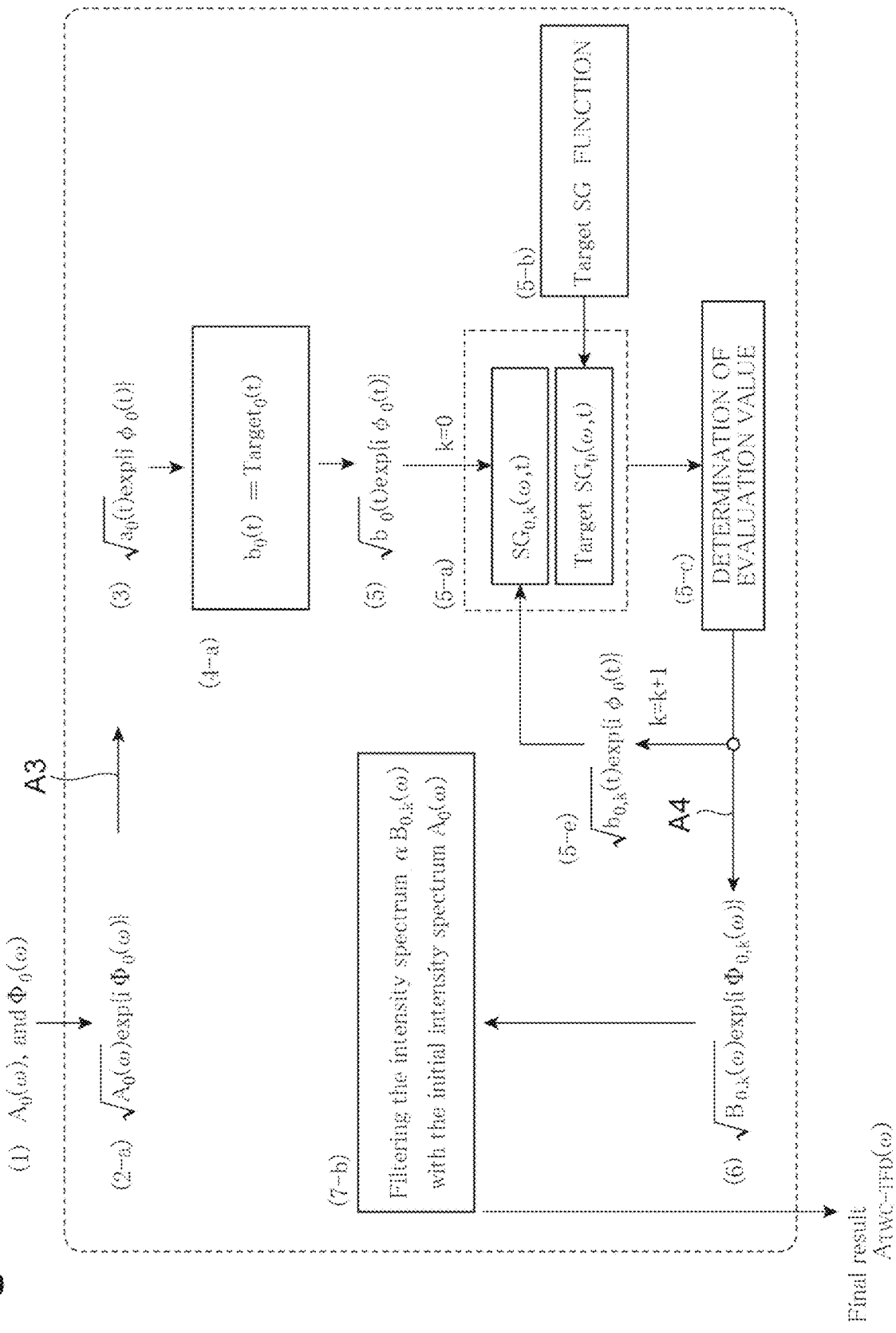
FIG. 9 is a diagram illustrating a calculation procedure of a spectrum intensity in the intensity spectrum design unit.

FIG. 9 is a diagram illustrating a calculation procedure of the spectrum intensity in the intensity spectrum design unit 23. In addition, since the process number (1) to the process number (5-c) are the same as the above-described calculation procedure of the spectrum phase in the phase spectrum design unit 22, the description thereof will be omitted.

When the evaluation value showing the similarity degree between the spectrogram $SG_{0,k}(\omega,t)$ and the target spectrogram $TargetSG_0(\omega,t)$ does not satisfy the predetermined end condition, the waveform function modification unit 27 of the intensity spectrum design unit 23 changes the temporal intensity waveform function $b_0(t)$ to the arbitrary temporal intensity waveform function $b_{0,k}(t)$ while constraining the temporal phase waveform function $\phi_0(t)$ included in the second waveform function by the initial value (process number (5-e)). The second waveform function after changing the temporal intensity waveform function is transformed again into a spectrogram by the time-frequency transform such as SIFT.

Subsequently, the process numbers (5-a) to (5-c) are repeatedly performed. In this way, the second waveform function is modified so as to bring the spectrogram $SG_{0,k}(\omega,t)$ gradually close to the target spectrogram $TargetSG_0(\omega,t)$ (waveform function modification step).

Thereafter, the inverse Fourier transform unit 28 of the intensity spectrum design unit 23 performs the inverse Fourier transform on the second waveform function after the modification (arrow A4 in the drawing) to generate a third waveform function (m) in the frequency domain (inverse Fourier transform step and process number (6)).

[Formula 12]

$$\sqrt{B_{0,k}(\omega)}\exp\{i\Phi_{0,k}(\omega)\} \quad (m)$$

Next, in a process number (7-b), a filter process unit of the intensity spectrum design unit 23 performs a filter process based on the intensity spectrum of the input light La on the intensity spectrum function $B_{0,k}(\omega)$ included in the third waveform function (m) (filter process step). Specifically, a portion exceeding a cutoff intensity for each wavelength, which is determined on the basis of the intensity spectrum of the input light La, is cut from the intensity spectrum obtained by multiplying the intensity spectrum function $B_{0,k}(\omega)$ by a coefficient $\alpha$. This is because the intensity spectrum function $\alpha B_{0,k}(\omega)$ is required to be prevented from exceeding the spectrum intensity of the input light La in all wavelength regions.

In one example, the cutoff intensity for each wavelength is set to be matched with the intensity spectrum of the input light La (initial intensity spectrum function $A_0(\omega)$ in the present embodiment). In this case, as shown in the following Formula (n), at frequencies where the intensity spectrum function $\alpha B_{0,k}(\omega)$ is larger than the intensity spectrum function $A_0(\omega)$, a value of the intensity spectrum function $A_0(\omega)$ is taken as the value of the intensity spectrum function $A_{TWC-TFD}(\omega)$. Further, at frequencies where the intensity spectrum function $\alpha B_{0,k}(\omega)$ is equal to or smaller than the intensity spectrum function $A_0(\omega)$, a value of the intensity spectrum function $\alpha B_{0,k}(\omega)$ is taken as the value of the intensity spectrum function $A_{TWC-TFD}(\omega)$ (process number (7-b) in the drawing).

[Formula 13]

$$A_{TWC-TFD}(\omega) = \begin{cases} A_0(\omega) & A_0(\omega) < \alpha B_{0,k}(\omega) \\ \alpha B_{0,k}(\omega) & A_0(\omega) \geq \alpha B_{0,k}(\omega) \end{cases} \quad (n)$$

The intensity spectrum function $A_{TWC-TFD}(\omega)$ is provided to the modulation pattern generation unit 24 as a desired spectrum intensity to be finally obtained.

The modulation pattern generation unit 24 calculates a phase modulation pattern (for example, a computer-generated hologram) to give the spectrum phase shown by the phase spectrum function $\Phi_{TWC-TFD}(\omega)$ calculated in the phase spectrum design unit 22 and the spectrum intensity shown by the intensity spectrum function $A_{TWC-TFD}(\omega)$ calculated in the intensity spectrum design unit 23 to the output light Ld (data generation step).

Figure 10:
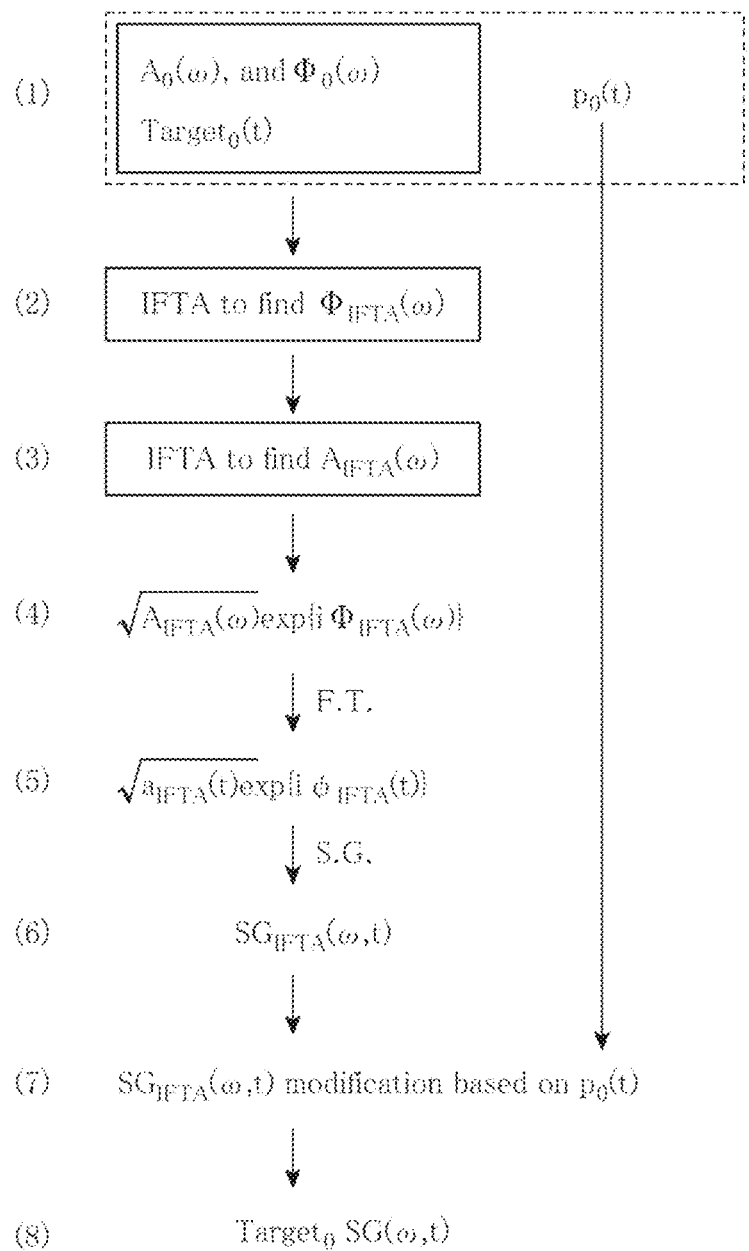
FIG. 10 is a diagram illustrating an example of a generation procedure of a target spectrogram in a target generation unit.

Here, FIG. 10 is a diagram illustrating an example of a generation procedure of the target spectrogram $TargetSG_0(\omega,t)$ in the target generation unit 29. Since the target spectrogram $TargetSG_0(\omega,t)$ shows a target temporal waveform (a temporal intensity waveform and a frequency component (wavelength band component) constituting it), the creation of the target spectrogram is a very important process for controlling the frequency component (wavelength band component).

As illustrated in FIG. 10, the target generation unit 29 first inputs the spectrum waveform (the initial intensity spectrum function $A_0(\omega)$ and the initial phase spectrum function $\Phi_0(\omega)$) and the desired temporal intensity waveform function $Target_0(t)$. Further, a temporal function $p_0(t)$ including desired frequency (wavelength) band information is input (process number (1)).

Next, the target generation unit 29 uses, for example, the iterative Fourier transform method illustrated in FIG. 7 or the method described in Non Patent Document 1 or 2 to calculate a phase spectrum function $\Phi_{IFTA}(\omega)$ for realizing the temporal intensity waveform function $Target_0(t)$ (process number (2)).

Figure 11:
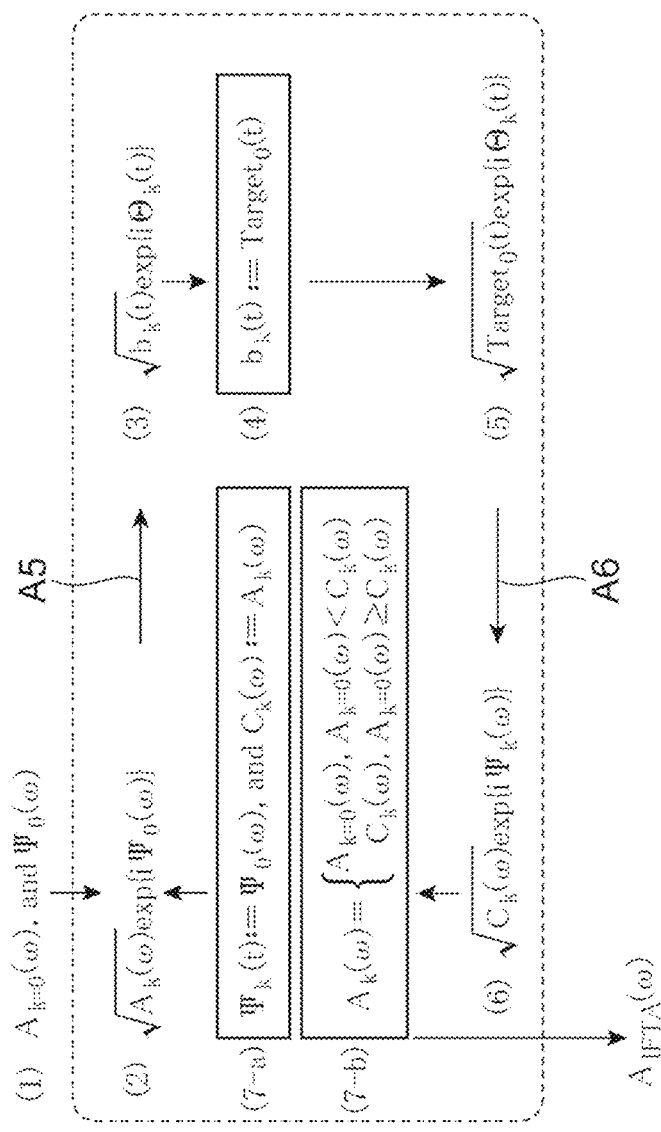
FIG. 11 is a diagram illustrating an example of a procedure for calculating an intensity spectrum.

Next, the target generation unit 29 calculates an intensity spectrum function $A_{IFTA}(\omega)$ for realizing the temporal intensity waveform function $Target_0(t)$, by the iterative Fourier transform method using the above obtained phase spectrum function $\Phi_{IFTA}(\omega)$ (process number (3)). Here, FIG. 11 is a diagram illustrating an example of a calculation procedure of the intensity spectrum function $A_{IFTA}(\omega)$.

First, the initial intensity spectrum function $A_{k=0}(\omega)$ and the phase spectrum function $\Psi_0(\omega)$ are prepared (process number (1) in the drawing). Next, a waveform function (o) in the frequency domain including the intensity spectrum function $A_k(\omega)$ and the phase spectrum function $\Psi_0(\omega)$ is prepared (process number (2) in the drawing).

[Formula 14]

$$\sqrt{A_k(\omega)}\exp\{i\Psi_0(\omega)\} \quad (o)$$

A subscript k represents after a k-th Fourier transform process. Before the first Fourier transform process, the initial intensity spectrum function $A_{k=0}(\omega)$ described above is used as the intensity spectrum function $A_k(\omega)$. i is an imaginary number.

Next, a Fourier transform from the frequency domain to the time domain is performed on the function (o) (arrow A5 in the drawing). As a result, a waveform function (p) in the frequency domain including a temporal intensity waveform function $b_k(t)$ is obtained (process number (3) in the drawing).

[Formula 15]

$$\sqrt{b_k(t)}\exp\{i\Theta_k(t)\} \quad (p)$$

Next, the temporal intensity waveform function $b_k(t)$ included in the function (p) is replaced by the temporal intensity waveform function $Target_0(t)$ based on the desired waveform (process numbers (4) and (5) in the drawing).

[Formula 16]

$$b_k(t) := Target_0(t) \quad (q)$$

[Formula 17]

$$\sqrt{\text{Target}_0(t)}\exp\{i\Theta_k(t)\} \qquad (r)$$

Next, an inverse Fourier transform from the time domain to the frequency domain is performed on the function (r) (arrow A6 in the drawing). As a result, a waveform function (s) in the frequency domain including an intensity spectrum function $C_k(\omega)$ and a phase spectrum function $\Psi_k(\omega)$ is obtained (process number (6) in the drawing).

[Formula 18]

$$\sqrt{C_k(\omega)}\exp\{i\Psi_k(\omega)\} \qquad (s)$$

Next, to constrain the phase spectrum function $\Psi_k(\omega)$ included in the function (s), this is replaced by the initial phase spectrum function $\Psi_0(\omega)$ (process number (7-a) in the drawing).

[Formula 19]

$$\Psi_k(\omega):=\Psi_0(\omega) \qquad (t)$$

Further, a filter process based on the intensity spectrum of the input light La is performed on the intensity spectrum function $C_k(\omega)$ in the frequency domain after the inverse Fourier transform. Specifically, a portion exceeding a cutoff intensity for each wavelength, which is determined on the basis of the intensity spectrum of the input light La, is cut from the intensity spectrum represented by the intensity spectrum function $C_k(\omega)$.

In one example, the cutoff intensity for each wavelength is set to be matched with the intensity spectrum (for example, the initial intensity spectrum function $A_{k=0}(\omega)$) of the input light La. In this case, as shown in the following Formula (u), at frequencies where the intensity spectrum function $C_k(\omega)$ is larger than the intensity spectrum function $A_{k=0}(\omega)$, a value of the intensity spectrum function $A_{k=0}(\omega)$ is taken as a value of the intensity spectrum function $A_k(\omega)$. Further, at frequencies where the intensity spectrum function $C_k(\omega)$ is equal to or smaller than the intensity spectrum function $A_{k=0}(\omega)$, a value of the intensity spectrum function $C_k(\omega)$ is taken as the value of the intensity spectrum function $A_k(\omega)$ (process number (7-b) in the drawing).

[Formula 20]

$$A_k(\omega) = \begin{cases} A_{k=0}(\omega), & A_{k=0}(\omega) < C_k(\omega) \\ C_k(\omega), & A_{k=0}(\omega) \geq C_k(\omega) \end{cases} \qquad (u)$$

The intensity spectrum function $C_k(\omega)$ included in the function (s) is replaced by the intensity spectrum function $A_k(\omega)$ after the filter process by the above Formula (u).

Subsequently, the above processes (1) to (7-b) are repeatedly performed, so that the intensity spectrum shape represented by the intensity spectrum function $A_k(\omega)$ in the waveform function can be brought close to the intensity spectrum shape corresponding to the desired temporal intensity waveform. Finally, an intensity spectrum function $A_{IFTA}(\omega)$ is obtained.

FIG. 10 is referred to again. By calculating the phase spectrum function $\Phi_{IFTA}(\omega)$ and the intensity spectrum function $A_{IFTA}(\omega)$ in the process numbers (2) and (3) described above, a third waveform function (v) in the frequency domain including these functions is obtained (process number (4)).

[Formula 21]

$$\sqrt{A_{IFTA}(\omega)}\exp\{i\Phi_{IFTA}(\omega)\} \qquad (v)$$

The Fourier transform unit 29a of the target generation unit 29 performs the Fourier transform on the above waveform function (v). As a result, a fourth waveform function (w) in the time domain is obtained (process number (5)).

[Formula 22]

$$\sqrt{a_{IFTA}(t)}\exp\{i\varphi_{IFTA}(t)\} \qquad (w)$$

The spectrogram modification unit 29b of the target generation unit 29 transforms the fourth waveform function (w) into a spectrogram $SG_{IFTA}(\omega,t)$ by the time-frequency transform (process number (6)). Then, in a process number (7), the spectrogram $SG_{IFTA}(\omega,t)$ is modified on the basis of the temporal function $p_0(t)$ including the desired frequency (wavelength) band information, so that the target spectrogram $TargetSG_0(\omega,t)$ is generated. For example, a characteristic pattern appearing in the spectrogram $SG_{IFTA}(\omega,t)$ constituted by two-dimensional data is partially cut out, and the frequency component of the corresponding portion is operated on the basis of the temporal function $p_0(t)$. A specific example thereof will be described in detail below.

For example, the case where triple pulses having time intervals of 2 picoseconds are set as the desired temporal intensity waveform function $Target_0(t)$ is considered. At this time, the spectrogram $SG_{IFTA}(\omega,t)$ has a result illustrated in (a) in FIG. 12. In addition, in (a) in FIG. 12, a horizontal axis shows a time (unit: femtosecond) and a vertical axis shows a wavelength (unit: nm). Further, a value of the spectrogram is shown by light and dark in the drawing and the value of the spectrogram is larger when the brightness is larger. In the spectrogram $SG_{IFTA}(\omega,t)$, the triple pulses appear as domains $D_1$, $D_2$, and $D_3$ divided on a time axis at intervals of 2 picoseconds. A center (peak) wavelength of the domains $D_1$, $D_2$, and $D_3$ is 800 nm.

When it is desired to control only the temporal intensity waveform of the output light Ld (it is simply desired to obtain triple pulses), it is not necessary to operate these domains $D_1$, $D_2$, and $D_3$. However, when it is desired to control a frequency (wavelength) band of each pulse, it is necessary to operate these domains $D_1$, $D_2$, and $D_3$. That is, as illustrated in (b) in FIG. 12, moving the respective domains $D_1$, $D_2$, and $D_3$ independently in a direction along a wavelength axis (vertical axis) means that a constituent frequency (wavelength band) of each pulse is changed. Changing the constituent frequency (wavelength band) of each pulse is performed on the basis of the temporal function $p_0(t)$.

Figure 12:
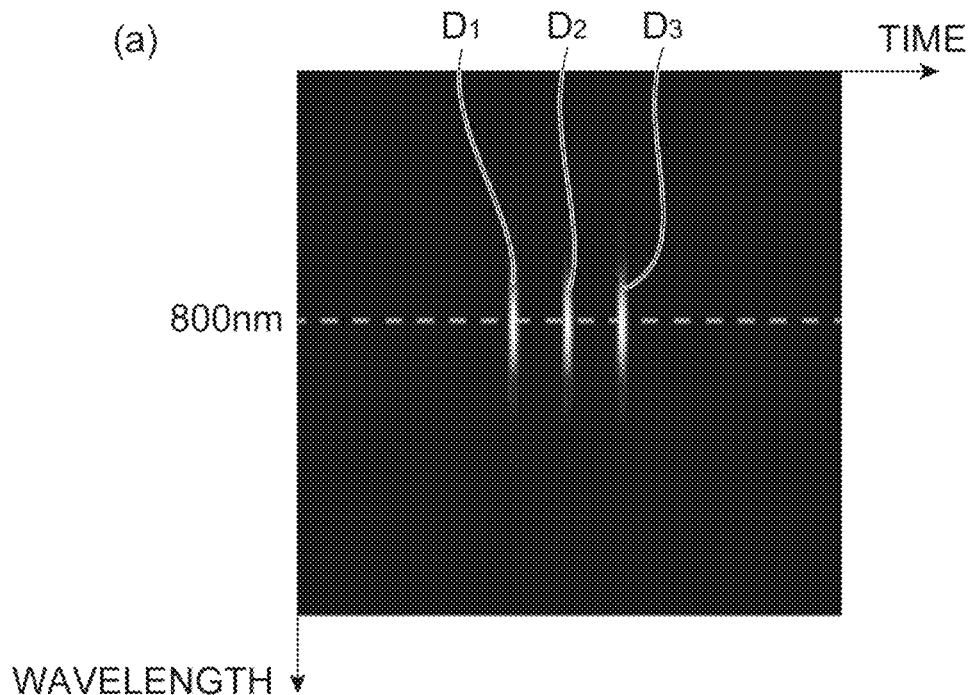
FIG. 12 includes (a), (b) diagrams illustrating a process of generating a target spectrogram.
Figure 12:
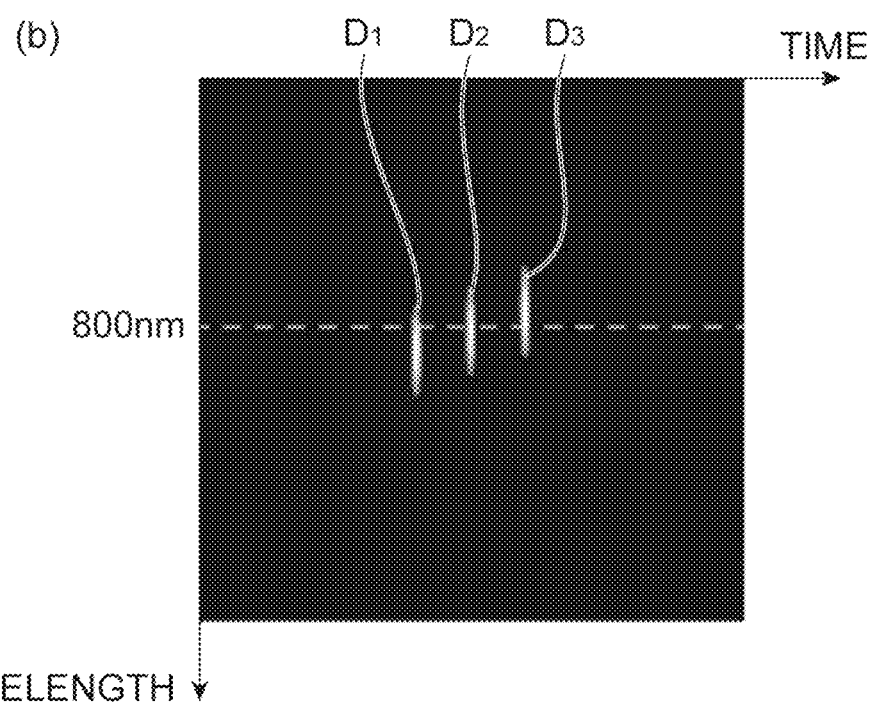

For example, when the temporal function $p_0(t)$ is described so that a peak wavelength of the domain $D_2$ is kept at 800 nm and peak wavelengths of the domains $D_1$ and $D_3$ are moved in parallel by −2 nm and +2 nm, respectively, the spectrogram $SG_{IFTA}(\omega,t)$ changes to the target spectrogram $TargetSG_0(\omega,t)$ illustrated in (b) in FIG. 12. For example, by performing such a process on the spectrogram, it is possible to create a target spectrogram in which the constituent frequency (wavelength band) of each pulse is arbitrarily controlled without changing the shape of the temporal intensity waveform.

Effects obtained by the modulation pattern calculation apparatus (data creation apparatus) 20, the light control apparatus 1A, the modulation pattern calculation method (data creation method), the computer-generated hologram, and the modulation pattern calculation program (data creation program) according to the present embodiment described above will be described.

As described above, in the present embodiment, after generating the second waveform function (h) in the time domain by performing the Fourier transform on the first waveform function (g) in the frequency domain, a replacement of the temporal intensity waveform function $\text{Target}_0(t)$ based on the desired waveform is performed for the second waveform function (h). Thereafter, the inverse Fourier transform is performed on the second waveform function to generate the third waveform functions (k) and (m) in the frequency domain. Further, a modulation pattern is generated on the basis of the phase spectrum function $\Phi_{0,k}(\omega)$ of the third waveform in function (k) and the intensity spectrum function $B_{0,k}(\omega)$ of the third waveform function (m). As a result, it is possible to suitably generate a modulation pattern for realizing a desired waveform.

In addition, in the present embodiment, after the replacement of the temporal intensity waveform function $\text{Target}_0(t)$, the second waveform function is modified so as to bring the spectrogram $SG_{0,k}(\omega,t)$ of the second waveform function close to the target spectrogram $\text{TargetSG}_0(\omega,t)$, before the inverse Fourier transform.

The target spectrogram $\text{TargetSG}_0(\omega,t)$ is generated in advance in accordance with the desired wavelength band, and the wavelength band of the second waveform function is modified to the desired wavelength band by this process. Therefore, the third waveform functions (k) and (m) obtained by performing the inverse Fourier transform on the second waveform function also become functions in the desired wavelength band. Further, as described above, the modulation pattern is generated on the basis of the phase spectrum function $(\Phi_{0,k}(\omega)$ of the third waveform function (k) and the intensity spectrum function $B_{0,k}(\omega)$ of the third waveform function (m). As described above, according to the present embodiment, it is possible to control wavelength components (frequency components) of light constituting an arbitrary temporal intensity waveform.

Further, as in the present embodiment, the waveform function modification unit 27 may calculate the evaluation value representing the similarity degree between the spectrogram $SG_{IFTA}(\omega,t)$ of the second waveform function and the target spectrogram $\text{TargetSG}_0(\omega,t)$, and may modify the second waveform function so that the evaluation value satisfies a predetermined condition. For example, by this method, the second waveform function can be accurately modified so as to bring the spectrogram $SG_{IFTA}(\omega,t)$ of the second waveform function close to the target spectrogram $\text{TargetSG}_0(\omega,t)$.

Further, as in the present embodiment, the waveform function modification unit 27 may change the temporal intensity waveform function $b_{0,k}(t)$ or the temporal phase waveform function $\phi_{0,k}(t)$ to modify the second waveform function. For example, by this method, the second waveform function can be suitably modified so as to bring the spectrogram $SG_{IFTA}(\omega,t)$ of the second waveform function close to the target spectrogram $\text{TargetSG}_0(\omega,t)$.

In addition, the modulation pattern calculation apparatus, the modulation pattern calculation method, and the modulation pattern calculation program are not limited to the present embodiment, and various changes are enabled. For example, in the present embodiment, the phase spectrum design unit 22 calculates the phase spectrum function $\Phi_{TWC\text{-}TFD}(\omega)$, the intensity spectrum design unit 23 calculates the intensity spectrum function $A_{TWC\text{-}TFD}(\omega)$, and the modulation pattern generation unit 24 generates a modulation pattern on the basis of both functions, however, the modulation pattern generation unit may generate the modulation pattern on the basis of one of the phase spectrum function $\Phi_{TWC\text{-}TFD}(\omega)$ and the intensity spectrum function $A_{TWC\text{-}TFD}(\omega)$.

Further, as the time-frequency transform when the waveform function modification unit 27 transforms the second waveform function into the spectrogram $SG_{0,k}(\omega,t)$ (process number (5-a) in FIG. 8 and FIG. 9), in the present embodiment, a short-time Fourier transform (STFT) and a wavelet transform are exemplified. In the time-frequency transform process, it is important to transform the temporal waveform into the spectrogram $SG_{0,k}(\omega,t)$ which is "time-frequency information". The reason is as follows; in the present embodiment, unlike the method of controlling only the temporal intensity waveform in the temporal waveform (for example, Non Patent Documents 1 and 2), a main purpose is to control the frequency component (band component) constituting the temporal waveform, and it is meaningful to extract the temporal intensity information and the frequency (band) information from the temporal waveform. That is, the time-frequency transform is not limited to the STFT and the wavelet transform, and various transform processes capable of extracting the frequency information from the temporal waveform can be applied.

Further, in the present embodiment, the waveform function modification unit 27 uses the evaluation value showing the similarity degree between the spectrogram $SG_{IFTA}(\omega,t)$ of the second waveform function and the target spectrogram $\text{TargetSG}_0(\omega,t)$ to determine how close these are to each other (process number (5-c) in FIG. 8 and FIG. 9). The target spectrogram $\text{TargetSG}_0(\omega,t)$ represents what kind of temporal intensity shape and frequency (band) information the desired temporal waveform includes and plays the role of a kind of target value (design drawing). Therefore, the evaluation value in the present embodiment can be one of indexes showing waveform control accuracy.

On the other hand, since the spectrogram $SG_{IFTA}(\omega,t)$ includes two variables such as the frequency co and the time t, it can also be handled as an image. Therefore, it can be thought that checking of a matching degree between the spectrogram $SG_{IFTA}(\omega,t)$ and the target spectrogram $\text{TargetSG}_0(\omega,t)$ is a difference extraction operation using various pattern matching methods in image analysis. Therefore, besides the method of using the evaluation value showing the similarity degree, for example, a method of extracting a feature amount (such as a contour/shape limited to a frequency or time axis direction) of the image and evaluating the matching degree of the pattern or a method of dividing the image into a plurality of parts and evaluating a matching degree for each part can be applied.

Further, in the present embodiment, when the evaluation value does not satisfy the predetermined condition (the spectrogram $SG_{IFTA}(\omega,t)$ and the target spectrogram $\text{TargetSG}_0(\omega,t)$ are different), the waveform function modification unit 27 changes the temporal phase waveform function $\phi_{0,k}(t)$ or the temporal intensity waveform function $b_{0,k}(t)$ to another function (process number (5-d) in FIG. 8 and process number (5-e) in FIG. 9).

There are various methods of changing these functions $\phi_{0,k}(t)$ and $b_{0,k}(t)$. As the simplest method, there is a method of randomly changing the functions $\phi_{0,k}(t)$ and $b_{0,k}(t)$. Further, a method of searching for solutions of the functions $\phi_{0,k}(t)$ and $b_{0,k}(t)$ according to a predetermined rule (according to a probability process) by a simulated annealing method or the like is also applicable.

Further, in the case where an index showing that which of the functions $\phi_{0,k}(t)$ and $b_{0,k}(t)$ is used to improve the evaluation value is obtained, the index may be used. For example, the magnitude of the evaluation value calculated in the process number (5-a) or the determination result in the process number (5-c) may be fed back at the time of changing the functions $\phi_{0,k}(t)$ and $b_{0,k}(t)$. Specifically, a new spectrogram $NewSG_0(\omega,t)$ is created on the basis of a difference value between the spectrogram $SG_{IFTA}(\omega,t)$ and the target spectrogram $TargetSG_0(\omega,t)$, and $NewSG_0(\omega,t)$ is transformed into the form of a temporal waveform by performing an inverse spectrogram transform. In the temporal phase or temporal intensity function of the temporal waveform obtained by performing the inverse spectrogram transform on $NewSG_0(\omega,t)$ obtained through the operation on the spectrogram, for example, the index (based on the operation on the spectrogram) showing that which of the functions $\phi_{0,k}(t)$ and $b_{0,k}(t)$ is used to improve the evaluation value is included. Therefore, a method of appropriately using the index as feedback for modification of the temporal phase waveform function $\phi_{0,k}(t)$ or the temporal intensity waveform function $b_{0,k}(t)$ can be considered.

Further, when the target generation unit 29 generates the target spectrogram $TargetSG_0(\omega,t)$, the phase spectrum function $\Phi_{IFTA}(\omega)$ for realizing the temporal intensity waveform function $Target_0(t)$ is calculated in the process number (2) illustrated in FIG. 10. At this time, it has been described that the iterative Fourier transform method illustrated in FIG. 7 or the method described in Non Patent Document 1 or 2 can be used, however, the method of calculating the phase spectrum function $\Phi_{IFTA}(\omega)$ is not limited thereto, and a phase spectrum function $\Phi_{IFTA}(\omega)$ to be analytically or approximately obtained that can realize generation of the temporal intensity waveform function $Target_0(t)$ may be used.

Further, when the target generation unit 29 generates the target spectrogram $TargetSG_0(\omega,t)$, the intensity spectrum function $A_{IFTA}(\omega)$ for realizing the temporal intensity waveform function $Target_0(t)$ is calculated in the process number (3) illustrated in FIG. 10. At this time, an example of calculating the intensity spectrum function $A_{IFTA}(\omega)$ using the improved iterative Fourier transform method, illustrated in FIG. 9, has been described, however, the method of calculating the intensity spectrum function $A_{IFTA}(\omega)$ is not limited thereto, and an intensity spectrum function $A_{IFTA}(\omega)$ to be analytically or approximately obtained that can realize generation of the temporal intensity waveform function $Target_0(t)$ may be used.

In addition, by using a computer located in a remote place such as a cloud server, the modulation pattern (for example, a computer-generated hologram) may be created on the basis of the modulation pattern calculation method (data creation method) of the present embodiment, and data relating to the created modulation pattern may be transmitted to a user.

First Example

It was confirmed that it is possible to control the temporal waveform including the control of the frequency (wavelength) band by performing calculation based on the modulation pattern calculation method (data creation method) according to the above embodiment. In the calculation, a single pulse whose wavelength band is 5 nm in full width at half maximum was set as the input light La, and double pulses of the interval of 2 picoseconds were set as the output light Ld. In this case, the target spectrogram $TargetSG(\omega,t)$ includes two domains.

In the present example, five target spectrograms $TargetSG(\omega,t)$ in which two domains are moved in parallel in the wavelength axis direction (that is, the frequency (wavelength) band constituting each pulse is changed) were prepared by the method illustrated in (b) in FIG. 12. Specifically, five kinds of target spectrograms $TargetSG_0(\omega,t)$ in which combinations of center wavelengths (peak wavelengths) of the two domains are (800 nm, 800 nm), (801 nm, 799 nm), (802 nm, 798 nm), (803 nm, 797 nm), and (804 nm, 796 nm) were prepared. In addition, the phase spectrum function $\Phi_{TWC-TFD}(\omega)$ was calculated using the method illustrated in FIG. 8, and the intensity spectrum function $A_{TWC-TFD}(\omega)$ was calculated using the method illustrated in FIG. 9.

Figure 13:
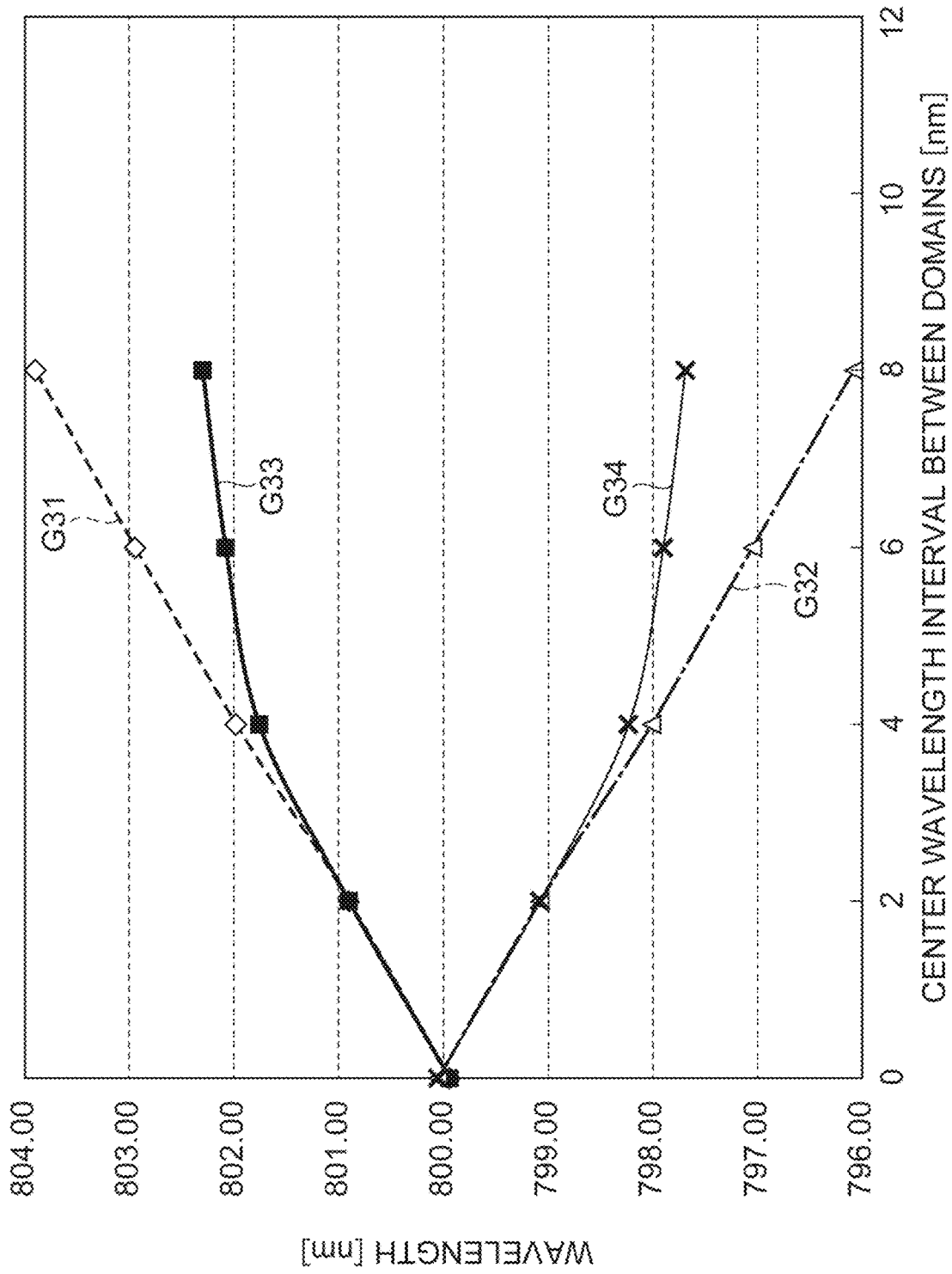
FIG. 13 is a graph illustrating center wavelengths of two domains included in each spectrogram in which an evaluation value satisfies a predetermined condition with respect to each corresponding target spectrogram and a center wavelength interval between the domains.

FIG. 13 is a graph illustrating center wavelengths of the two domains included in each spectrogram $SG_{0,k}(\omega,t)$ in which an evaluation value satisfies a predetermined condition with respect to each corresponding target spectrogram $TargetSG_0(\omega,t)$, and a center wavelength interval between the domains. A vertical axis shows the center wavelength of each domain, and a horizontal axis shows the center wavelength interval between the domains. Further, graphs G31 and G32 are straight lines respectively connecting the center wavelengths of one domain and the other domain included in the target spectrogram $TargetSG_0(\omega,t)$, and graphs G33 and G34 are approximate curves respectively connecting the center wavelengths of one domain and the other domain included in the spectrogram $SG_{0,k}(\omega,t)$.

From this result, it was shown that it is possible to control the temporal waveform including the frequency (wavelength) band when a wavelength band difference of adjacent pulses is within 4 nm, for example. That is, it was shown that a change to an arbitrary wavelength band is substantially enabled within a range of the full width at half maximum (5 nm) of the wavelength band of the input light La. In other words, when the domain of the target spectrogram $TargetSG(\omega,t)$ is moved in the wavelength axis direction, it is desirable to move the domain within the wavelength band of the input light La.

Figure 14:
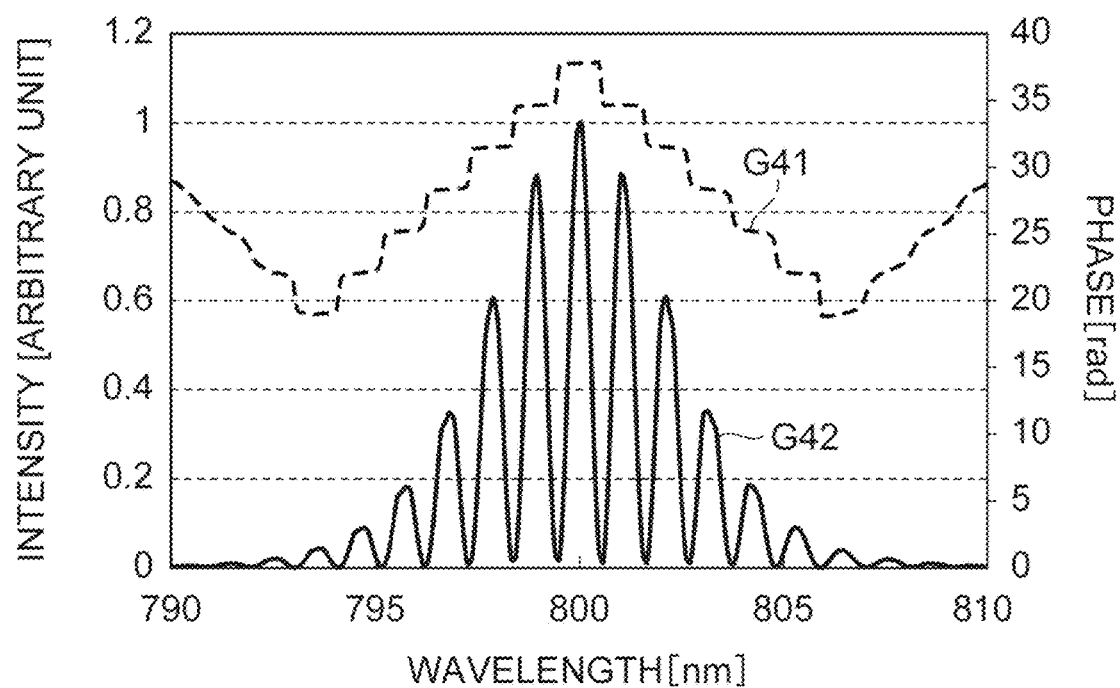
FIG. 14 includes (a) a graph illustrating a spectrum waveform when a combination of center wavelengths of two domains of a target spectrogram is (800 nm, 800 nm), and (b) a graph illustrating a temporal intensity waveform of output light obtained by performing a Fourier transform on the spectrum waveform of (a).
Figure 14:
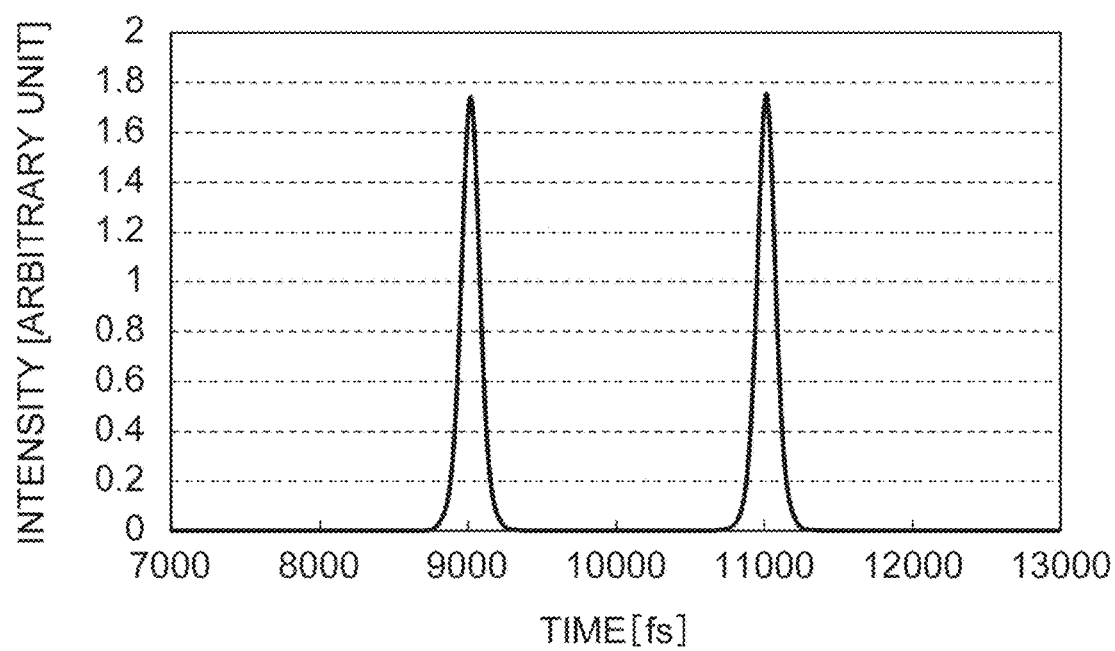
Figure 15:
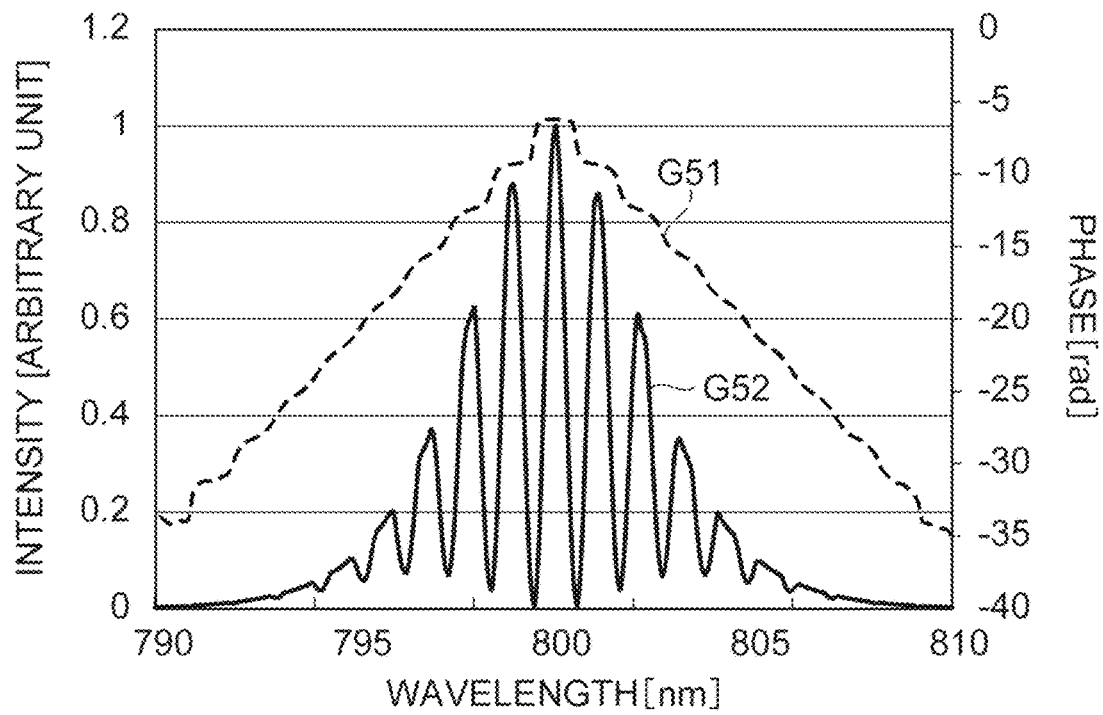
FIG. 15 includes (a) a graph illustrating a spectrum waveform when a combination of center wavelengths of two domains of a target spectrogram is (802 nm, 798 nm), and (b) a graph illustrating a temporal intensity waveform of output light obtained by performing a Fourier transform on the spectrum waveform of (a).
Figure 15:
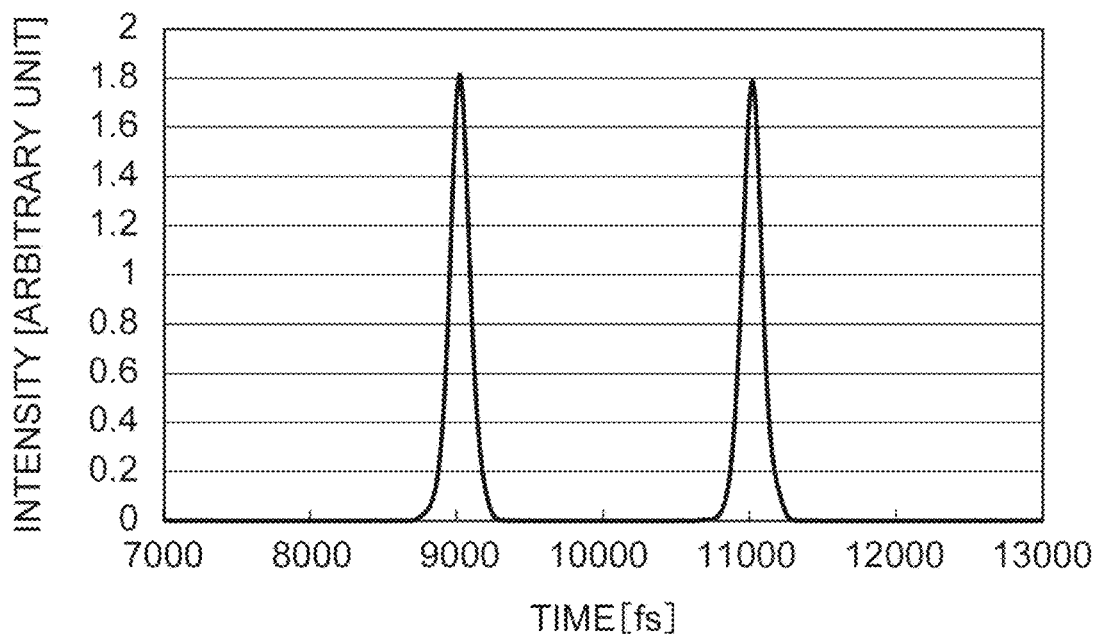

(a) in FIG. 14 is a graph illustrating a spectrum waveform (a spectrum phase G41 and a spectrum intensity G42) obtained using the methods illustrated in FIG. 8 and FIG. 9, in which a combination of the center wavelengths of the two domains of the target spectrogram $TargetSG(\omega,t)$ is set to (800 nm, 800 nm). (b) in FIG. 14 is a graph illustrating a temporal intensity waveform of the output light Ld obtained by performing the Fourier transform on the spectrum waveform of (a) in FIG. 14. Further, (a) in FIG. 15 is a graph illustrating a spectrum waveform (a spectrum phase G51 and a spectrum intensity G52) obtained using the methods illustrated in FIG. 8 and FIG. 9, in which a combination of the center wavelengths of the two domains of the target spectrogram $TargetSG(\omega,t)$ is set to (802 nm, 798 nm). (b) in FIG. 15 is a graph illustrating a temporal intensity waveform of the output light Ld obtained by performing the Fourier transform on the spectrum waveform of (a) in FIG. 15.

When (a) in FIG. 14 is compared with (a) in FIG. 15, when the center wavelengths of the respective domains are 800 nm and 800 nm ((a) in FIG. 14), the phase spectrum (G41) is stepwise, and folding back occurs in the phase spectrum (G41) at the wavelength near the tail of the intensity spectrum (G42). On the other hand, when the center wavelengths of the respective domains are 802 nm and 798 nm ((a) in FIG. 15), the step of the phase spectrum (G51) becomes smoother as it approaches the wavelength near the tail of the spectrum intensity (G52), and folding back of the phase spectrum (G51) does not occur. From this, it can be seen that a clear difference occurs in the phase spectrum of the output light Ld to control the frequency (wavelength) band of the output light Ld.

Further, when (b) in FIG. 14 is compared with (b) in FIG. 15, it can be seen that the similar temporal intensity waveforms are obtained, regardless of the difference in control of the frequency (wavelength) band of the output light Ld.

Second Example

Figure 16:
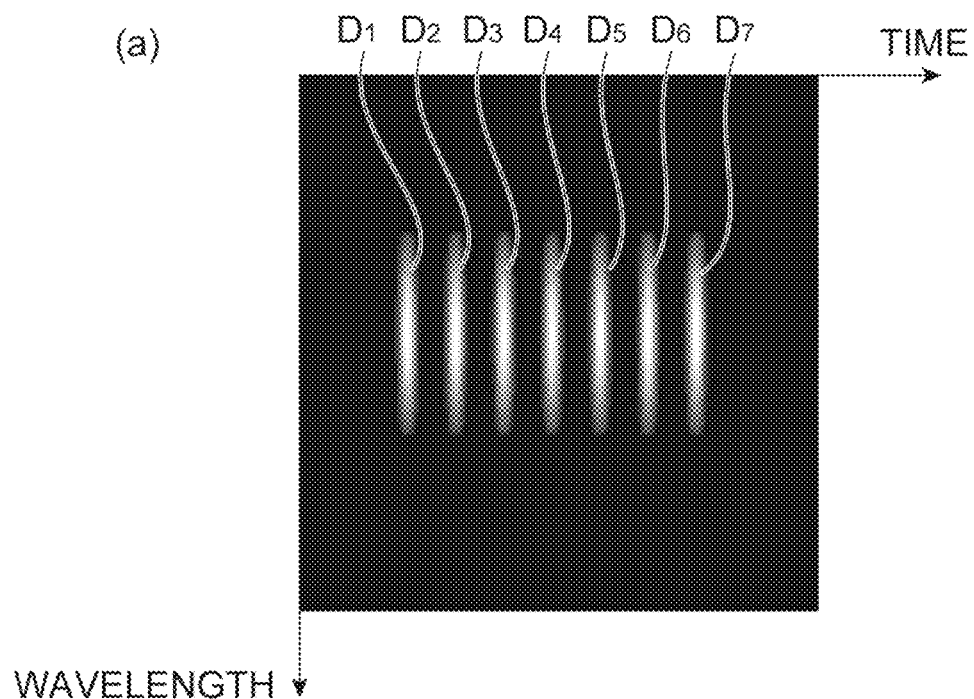
FIG. 16 includes (a) a diagram illustrating a target spectrogram used in a second example, and (b) a spectrogram calculated on the basis of the target spectrogram of (a).
Figure 16:
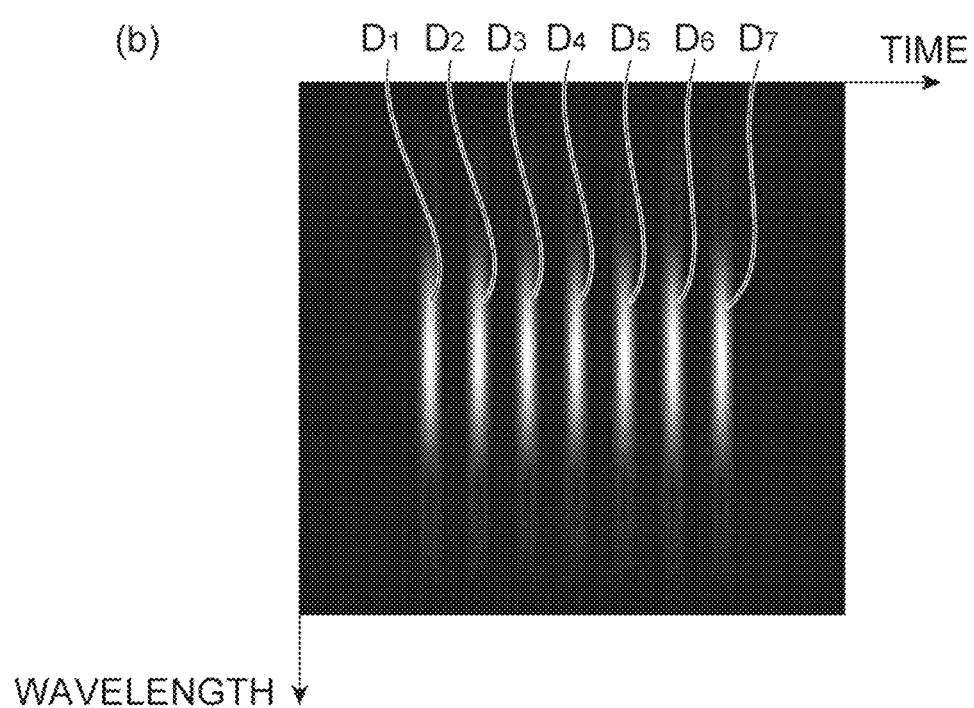
Figure 17:
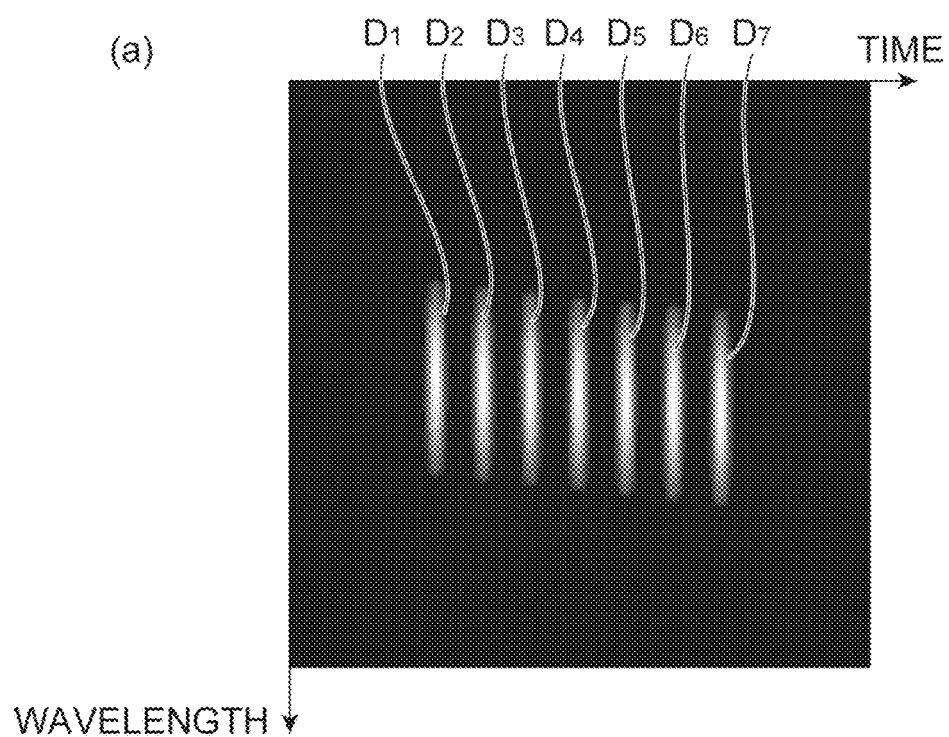
FIG. 17 includes (a) a diagram illustrating a target spectrogram used in the second example, and (b) a spectrogram calculated on the basis of the target spectrogram of (a).
Figure 17:
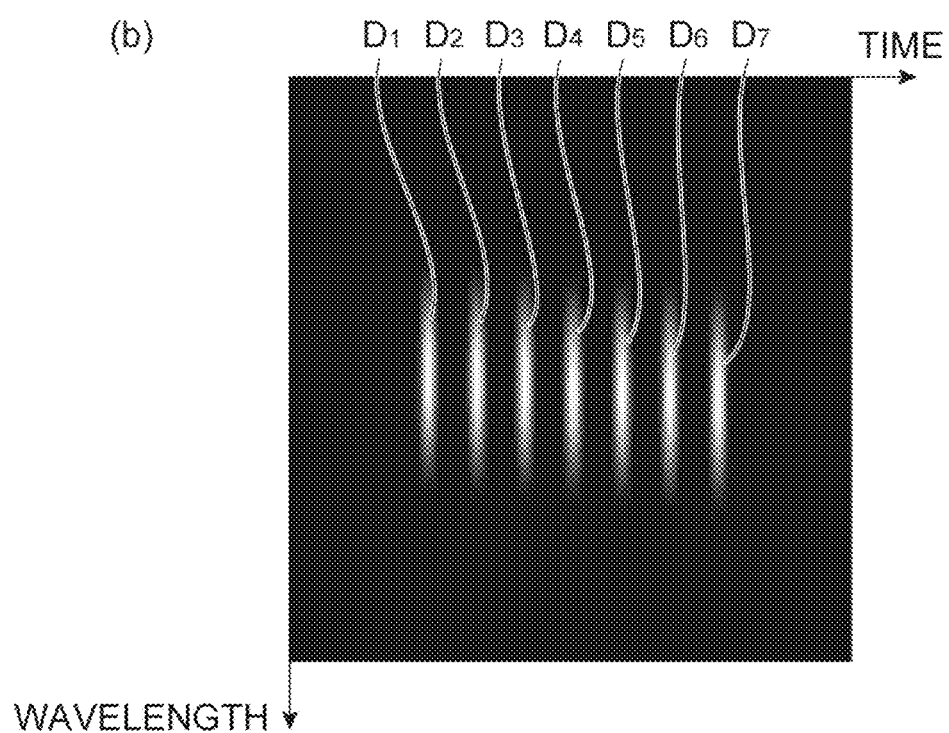

Next, an example in which output light Ld having seven pulses is generated and wavelength bands of the respective pulses are caused to be different will be described. (a) in FIG. 16 and (a) in FIG. 17 illustrate the target spectrograms TargetSG($\omega$,t) used in this example. (a) in FIG. 16 illustrates the case where the wavelength bands of the respective pulses are not controlled (equalized), and (a) in FIG. 17 illustrates the case where the wavelength bands of the respective pulses are caused to be different. Further, (b) in FIG. 16 and (b) in FIG. 17 illustrate the spectrograms $SG_{0,k}(\omega,t)$ calculated on the basis of the target spectrograms TargetSG($\omega$,t) in (a) in FIG. 16 and (a) in FIG. 17.

In addition, in these drawings, a horizontal axis shows a time (unit: femtosecond) and a vertical axis shows a wavelength (unit: nm). Further, a value of the spectrogram is shown by light and dark in the drawing and the value of the spectrogram is larger when the brightness is larger. In the present example, the target spectrogram TargetSG($\omega$,t) and the spectrogram $SG_{0,k}(\omega,t)$ include the same number of domains $D_1$ to $D_7$ as the number of pulses.

Figure 18:
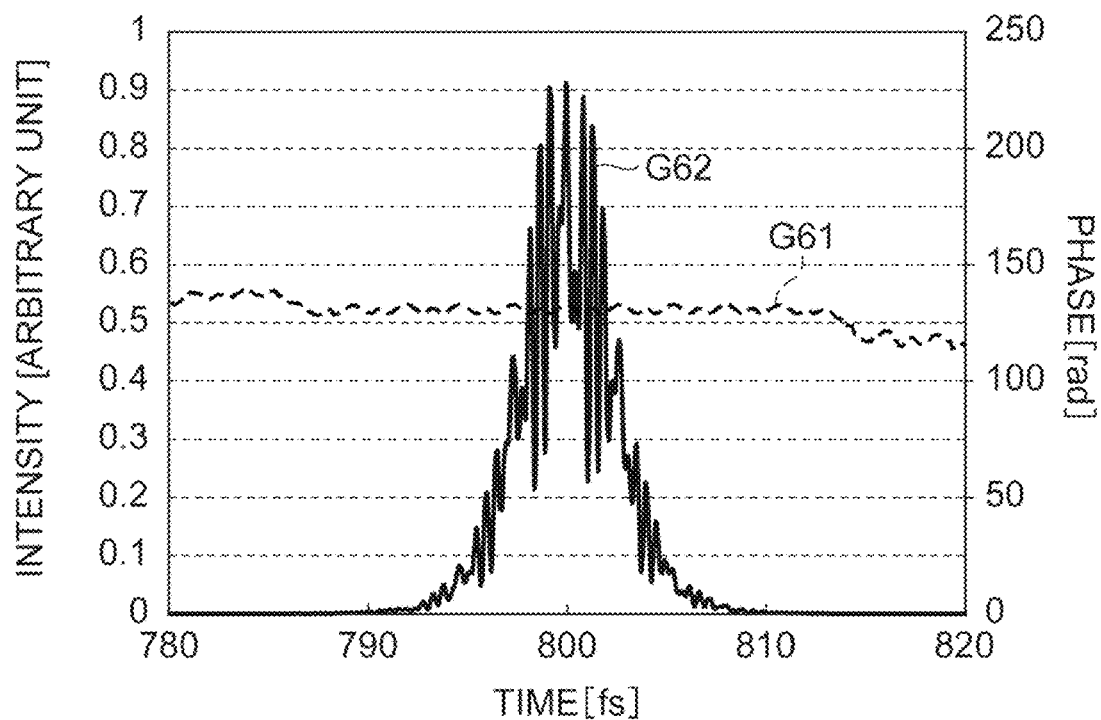
FIG. 18 includes (a) a graph illustrating a spectrum waveform calculated from a spectrogram of (b) in FIG. 16, and (b) a graph illustrating a temporal intensity waveform of output light obtained by performing a Fourier transform on the spectrum waveform of (a).
Figure 18:
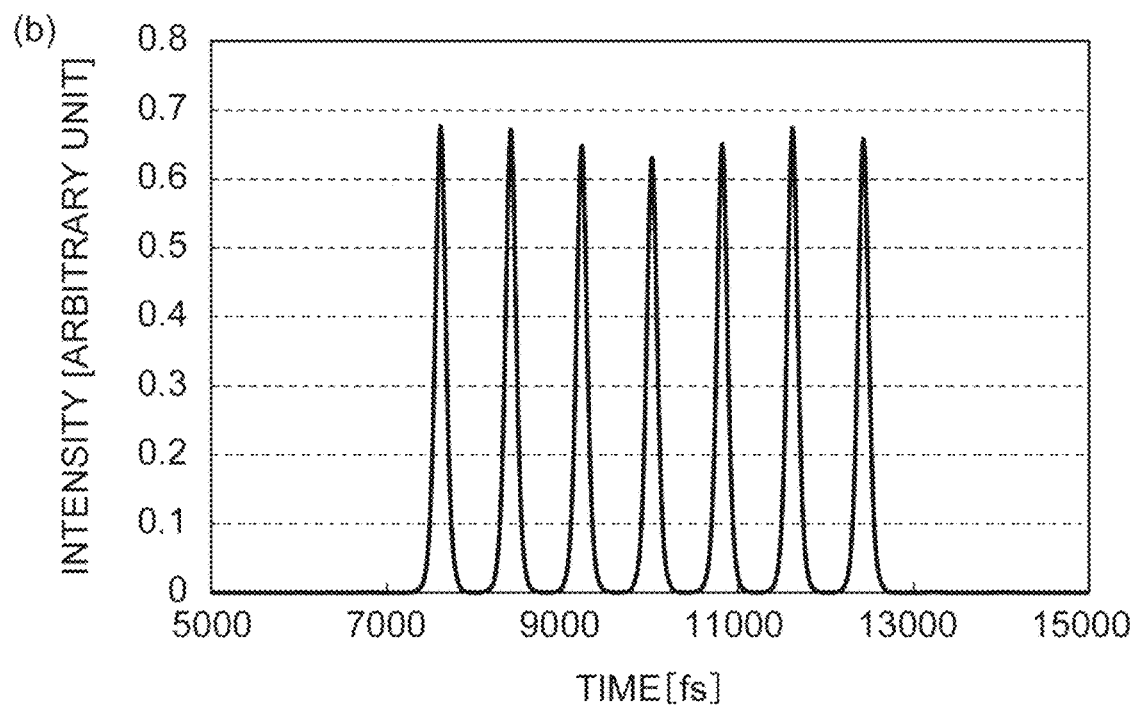
Figure 19:
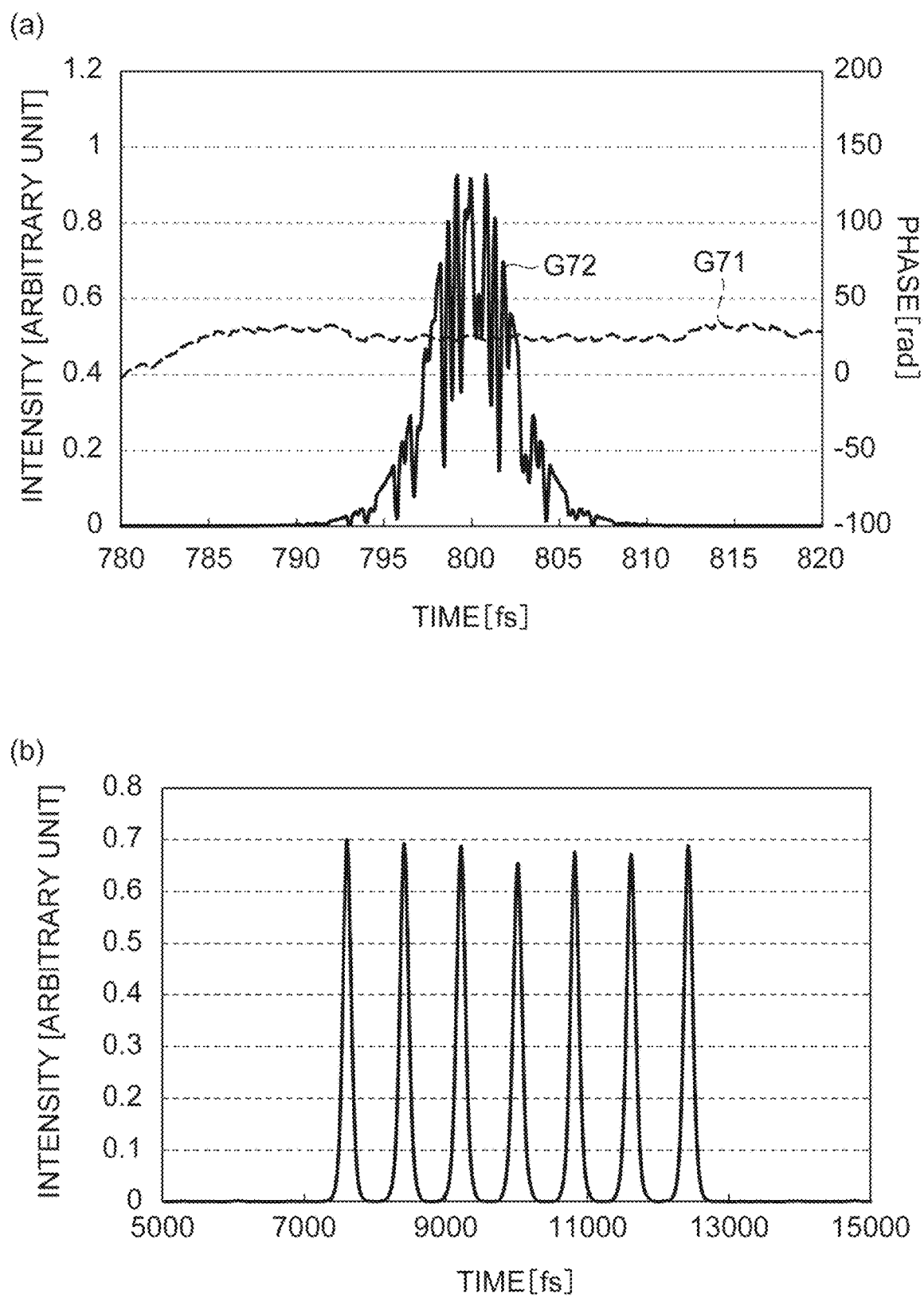
FIG. 19 includes (a) a graph illustrating a spectrum waveform calculated from a spectrogram of (b) in FIG. 17, and (b) a graph illustrating a temporal intensity waveform of output light obtained by performing a Fourier transform on the spectrum waveform of (a).

(a) in FIG. 18 is a graph illustrating a spectrum waveform (a spectrum phase G61 and a spectrum intensity G62) calculated from the temporal waveform (second waveform function) corresponding to the spectrogram $SG_{0,k}(\omega,t)$ in (b) in FIG. 16. (b) in FIG. 18 is a graph illustrating the temporal intensity waveform of the output light Ld obtained by performing the Fourier transform on the spectrum waveform of (a) in FIG. 18. Further, (a) in FIG. 19 is a graph illustrating a spectrum waveform (a spectrum phase G71 and a spectrum intensity G72) calculated from the temporal waveform (second waveform function) corresponding to the spectrogram $SG_{0,k}(\omega,t)$ in (b) in FIG. 17. (b) in FIG. 19 is a graph illustrating the temporal intensity waveform of the output light Ld obtained by performing the Fourier transform on the spectrum waveform of (a) in FIG. 19.

When (a) in FIG. 18 is compared with (a) in FIG. 19, it can be seen that a clear difference occurs in the phase spectrum of the output light Ld in the case where the center wavelengths of the respective domains are equal ((a) in FIG. 18) and the case where the center wavelengths of the respective domains are different ((a) in FIG. 19). On the other hand, when (b) in FIG. 18 is compared with (b) in FIG. 19, it can be seen that the similar temporal intensity waveforms are obtained, regardless of the difference in control of the frequency (wavelength) band of the output light Ld.

The data creation apparatus, the light control apparatus, the data creation method, and the data creation program are not limited to the embodiments described above, and various modifications can be made. For example, in the above embodiment, the optical system (the diffraction grating 12 and the lens 13) for guiding the input light to the SLM and the optical system (the lens 15 and the diffraction grating 16) for generating the output light are individually provided, however, these optical systems may be common. In this case, the SLM is preferably of a reflection type.

The data creation apparatus of the above embodiment is an apparatus for creating data for controlling a spatial light modulator, and is configured to include a Fourier transform unit for performing a Fourier transform on a first waveform function in a frequency domain including an intensity spectrum function and a phase spectrum function, and generating a second waveform function in a time domain including a temporal intensity waveform function and a temporal phase waveform function; a function replacement unit for performing a replacement of the temporal intensity waveform function based on a desired waveform for the second waveform function; a waveform function modification unit for modifying the second waveform function so as to bring a spectrogram of the second waveform function close to a target spectrogram generated in advance in accordance with the desired waveform and a desired wavelength band; an inverse Fourier transform unit for performing an inverse Fourier transform on the second waveform function after the modification, and generating a third waveform function in the frequency domain; and a data generation unit for generating the data on the basis of an intensity spectrum function or a phase spectrum function of the third waveform function.

The data creation method of the above embodiment is a method for creating data for controlling a spatial light modulator, and is configured to include a Fourier transform step of performing a Fourier transform on a first waveform function in a frequency domain including an intensity spectrum function and a phase spectrum function, and generating a second waveform function in a time domain including a temporal intensity waveform function and a temporal phase waveform function; a function replacement step of performing a replacement of the temporal intensity waveform function based on a desired waveform for the second waveform function; a waveform function modification step of modifying the second waveform function so as to bring a spectrogram of the second waveform function close to a target spectrogram generated in advance in accordance with the desired waveform and a desired wavelength band; an inverse Fourier transform step of performing an inverse Fourier transform on the second waveform function after the modification, and generating a third waveform function in the frequency domain; and a data generation step of generating the data on the basis of an intensity spectrum function or a phase spectrum function of the third waveform function.

The data creation program of the above embodiment is a program for creating data for controlling a spatial light modulator, and is configured to cause a computer to execute a Fourier transform step of performing a Fourier transform on a first waveform function in a frequency domain including an intensity spectrum function and a phase spectrum function, and generating a second waveform function in a time domain including a temporal intensity waveform function and a temporal phase waveform function; a function replacement step of performing a replacement of the temporal intensity waveform function based on a desired waveform for the second waveform function; a waveform function modification step of modifying the second waveform function so as to bring a spectrogram of the second waveform function close to a target spectrogram generated in advance in accordance with the desired waveform and a desired wavelength band; an inverse Fourier transform step of performing an inverse Fourier transform on the second waveform function after the modification, and generating a third waveform function in the frequency domain; and a data generation step of generating the data on the basis of an intensity spectrum function or a phase spectrum function of the third waveform function.

In the above data creation apparatus, the data creation method, and the data creation program, the waveform function modification unit (waveform function modification step) may be configured to calculate an evaluation value representing a similarity degree between the spectrogram of the second waveform function and the target spectrogram, and modify the second waveform function so that the evaluation value satisfies a predetermined condition. For example, by this method, the second waveform function can be accurately modified so as to bring the spectrogram of the second waveform function close to the target spectrogram.

In the above data creation apparatus, the data creation method, and the data creation program, the waveform function modification unit (waveform function modification step) may be configured to change the temporal intensity waveform function or the temporal phase waveform function for modifying the second waveform function. For example, by this method, the second waveform function can be suitably modified so as to bring the spectrogram of the second waveform function close to the target spectrogram.

The above data creation apparatus, the data creation method, and the data creation program may be configured to further include a target generation unit (target generation step) for generating the target spectrogram, and the target generation unit (target generation step) may be configured to include a Fourier transform unit (Fourier transform step) for performing a Fourier transform on the third waveform function in the frequency domain including the intensity spectrum function and the phase spectrum function for realizing the desired waveform, and generating a fourth waveform function in the time domain including a temporal intensity waveform function and a temporal phase waveform function, and a spectrogram modification unit (spectrogram modification step) for modifying a wavelength band of a spectrogram of the fourth waveform function in accordance with the desired wavelength band.

The data creation apparatus, the data creation method, and the data creation program include the above target generation unit (target generation step), so that the target spectrogram can be suitably generated in advance.

Further, the light control apparatus of the above embodiment is configured to include a light source for outputting input light; a dispersive element for spectrally dispersing the input light; a spatial light modulator for modulating at least one of an intensity spectrum and a phase spectrum of the input light after the dispersion, and outputting modulated light; and an optical system for focusing the modulated light, and the spatial light modulator is configured to modulate at least one of the intensity spectrum and the phase spectrum of the input light on the basis of the data calculated by the data creation apparatus of the above configuration.

Further, the computer-generated hologram of the above embodiment is created by the data creation method of the above configuration. When the spatial light modulator is controlled by the above computer-generated hologram, wavelength components (frequency components) of light constituting a temporal intensity waveform can be controlled.

INDUSTRIAL APPLICABILITY

An embodiment can be used as a data creation apparatus, a light control apparatus, a data creation method, and a data creation program capable of controlling a wavelength component (frequency component) of light constituting a temporal intensity waveform.

REFERENCE SIGNS LIST

1A—light control apparatus, 2—light source, 10—optical system, 12, 16—diffraction grating, 13, 15—lens, 14—SLM, 17—modulation plane, 17a—modulation region, 20—modulation pattern calculation apparatus, 21—arbitrary waveform input unit, 22—phase spectrum design unit, 23—intensity spectrum design unit, 24—modulation pattern generation unit, 25—Fourier transform unit, 26—function replacement unit, 27—waveform function modification unit, 28—inverse Fourier transform unit, 29—target generation unit, 29a—Fourier transform unit, 29b—spectrogram modification unit, $D_1$ to $D_7$—domain, La—input light, Ld—output light, SC—control signal.

The invention claimed is:

1. A data creation apparatus for creating data for controlling a spatial light modulator, the apparatus comprising:
a Fourier transform unit configured to perform a Fourier transform on a first waveform function in a frequency domain including an intensity spectrum function and a phase spectrum function, and generate a second waveform function in a time domain including a temporal intensity waveform function and a temporal phase waveform function;
a function replacement unit configured to perform a replacement of the temporal intensity waveform function based on a desired waveform for the second waveform function;
a waveform function modification unit configured to modify the second waveform function so as to bring a spectrogram of the second waveform function close to a target spectrogram generated in advance in accordance with the desired waveform and a desired wavelength band;
an inverse Fourier transform unit configured to perform an inverse Fourier transform on the second waveform function after the modification, and generate a third waveform function in the frequency domain; and
a data generation unit configured to generate the data on the basis of an intensity spectrum function or a phase spectrum function of the third waveform function.

2. The data creation apparatus according to claim 1, wherein the waveform function modification unit is configured to calculate an evaluation value representing a similarity degree between the spectrogram of the second waveform function and the target spectrogram, and modify the second waveform function so that the evaluation value satisfies a predetermined condition.

3. The data creation apparatus according to claim 1, wherein the waveform function modification unit is configured to change the temporal intensity waveform function or the temporal phase waveform function for modifying the second waveform function.

4. The data creation apparatus according to claim 1, further comprising:
a target generation unit configured to generate the target spectrogram, wherein
the target generation unit includes:
a Fourier transform unit configured to perform a Fourier transform on the third waveform function in the frequency domain including the intensity spectrum function and the phase spectrum function for realizing the desired waveform, and generate a fourth waveform function in the time domain including a temporal intensity waveform function and a temporal phase waveform function, and
a spectrogram modification unit configured to modify a wavelength band of a spectrogram of the fourth waveform function in accordance with the desired wavelength band.

5. A light control apparatus comprising:
a light source configured to output input light;
a dispersive element configured to spectrally disperse the input light;
a spatial light modulator configured to modulate at least one of an intensity spectrum and a phase spectrum of the input light after the dispersion, and output modulated light; and
an optical system configured to focus the modulated light, wherein
the spatial light modulator is configured to modulate at least one of the intensity spectrum and the phase spectrum of the input light on the basis of the data created by the data creation apparatus according to claim 1.

6. A data creation method for creating data for controlling a spatial light modulator, the method comprising:
a Fourier transform step of performing a Fourier transform on a first waveform function in a frequency domain including an intensity spectrum function and a phase spectrum function, and generating a second waveform function in a time domain including a temporal intensity waveform function and a temporal phase waveform function;
a function replacement step of performing a replacement of the temporal intensity waveform function based on a desired waveform for the second waveform function;
a waveform function modification step of modifying the second waveform function so as to bring a spectrogram of the second waveform function close to a target spectrogram generated in advance in accordance with the desired waveform and a desired wavelength band;
an inverse Fourier transform step of performing an inverse Fourier transform on the second waveform function after the modification, and generating a third waveform function in the frequency domain; and
a data generation step of generating the data on the basis of an intensity spectrum function or a phase spectrum function of the third waveform function.

7. A data creation program for creating data for controlling a spatial light modulator, the program causing a computer to execute:
a Fourier transform step of performing a Fourier transform on a first waveform function in a frequency domain including an intensity spectrum function and a phase spectrum function, and generating a second waveform function in a time domain including a temporal intensity waveform function and a temporal phase waveform function;
a function replacement step of performing a replacement of the temporal intensity waveform function based on a desired waveform for the second waveform function;
a waveform function modification step of modifying the second waveform function so as to bring a spectrogram of the second waveform function close to a target spectrogram generated in advance in accordance with the desired waveform and a desired wavelength band;
an inverse Fourier transform step of performing an inverse Fourier transform on the second waveform function after the modification, and generating a third waveform function in the frequency domain; and
a data generation step of generating the data on the basis of an intensity spectrum function or a phase spectrum function of the third waveform function.

* * * * *